(12) United States Patent
Johnston et al.

(10) Patent No.: US 11,391,143 B2
(45) Date of Patent: Jul. 19, 2022

(54) WELL PLANNING SYSTEM

(71) Applicant: Schlumberger Technology Corporation, Sugar Land, TX (US)

(72) Inventors: Lucian Johnston, Sugar Land, TX (US); Michael Dietrick Sturm, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 240 days.

(21) Appl. No.: 16/646,177

(22) PCT Filed: Sep. 11, 2018

(86) PCT No.: PCT/US2018/050314
§ 371 (c)(1),
(2) Date: Mar. 11, 2020

(87) PCT Pub. No.: WO2019/051435
PCT Pub. Date: Mar. 14, 2019

(65) Prior Publication Data
US 2020/0277848 A1 Sep. 3, 2020

Related U.S. Application Data

(60) Provisional application No. 62/557,115, filed on Sep. 11, 2017.

(51) Int. Cl.
*G06Q 50/02* (2012.01)
*E21B 44/00* (2006.01)
*E21B 7/04* (2006.01)

(52) U.S. Cl.
CPC ............... *E21B 44/00* (2013.01); *E21B 7/04* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 8,985,242 B2 | 3/2015 | Samuel et al. | |
| 9,638,830 B2 | 5/2017 | Meyer et al. | |
| 10,275,715 B2 | 4/2019 | Laing et al. | |
| 10,963,815 B2 | 3/2021 | Burch et al. | |
| 2012/0316787 A1 | 12/2012 | Moran et al. | |

(Continued)

FOREIGN PATENT DOCUMENTS

| | | |
|---|---|---|
| WO | 20130188241 | 12/2013 |
| WO | 2016/168596 A1 | 10/2016 |

OTHER PUBLICATIONS

International Search Report and Written Opinion for the counterpart International patent application PCT/US2018/050314 dated Jan. 2, 2019.

(Continued)

*Primary Examiner* — Syed A Roni
(74) *Attorney, Agent, or Firm* — Alec J. McGinn

(57) ABSTRACT

A method can include receiving a digital well plan; issuing drilling instructions for drilling a well based at least in part on the digital well plan; comparing acquired information associated with drilling of the well with well plan information of the digital well plan; and outputting results based at least in part on the comparing of the acquired information with the well plan information

15 Claims, 21 Drawing Sheets

(56) References Cited

U.S. PATENT DOCUMENTS

2014/0151121 A1    6/2014  Boone et al.
2014/0351183 A1*  11/2014  Germain

OTHER PUBLICATIONS

International Preliminary Report on Patentability for the counterpart International patent application PCT/US2018/050314 dated Mar. 26, 2020.
Extended Search Report received in European Patent Application No. 18854775.6 dated Apr. 16, 2021, 5 pages.
First Office Action issued in Chinese Patent Application 201880069909.9 dated Oct. 26, 2021, 24 pages with English Translation.

* cited by examiner

Trajectory Table    1910

| Comment | MD ft | Incl deg | Azim deg | TVD ft | NS ft | EW ft | DLS deg/100ft | Closure ft | deg |
|---|---|---|---|---|---|---|---|---|---|
| | 0.00 | 0.00 | | 0.00 | 0.00 | 0.00 | | | |
| | 2410.00 | 0.00 | 231.93 | 2410.00 | 0.00 | 0.00 | 0.00 | | |
| | 2986.66 | 6.92 | 231.93 | 2985.26 | -21.45 | -27.38 | 1.20 | | |
| | 3284.31 | 6.92 | 231.93 | 3280.74 | -43.56 | -55.62 | 0.00 | | |
| | 3860.97 | 0.00 | 231.93 | 3856.00 | -65.00 | -83.00 | 1.20 | | |
| | 6160.97 | 0.00 | 231.93 | 6156.00 | -65.00 | -83.00 | 0.00 | | |
| | 6753.87 | 35.87 | 6.67 | 6710.92 | 113.39 | -62.14 | 6.05 | | |
| | 6945.59 | 35.87 | 6.67 | 6866.28 | 224.97 | -49.09 | 0.00 | | |

| Part | SEQ | Survey Tool (Survey Tool Code) | Service Provider | Hole (Size) | Casing (Size) | Depth Interval (From) | Depth Interval (TO) | Survey Frequency |
|---|---|---|---|---|---|---|---|---|
| 1 | 1 | A001Ma_MWD | N/A | N/A | N/A | 0.00 | 11477.67 | N/A |

Fig. 19

WELL PLANNING SYSTEM

RELATED APPLICATIONS

This application claims priority to and the benefit of a U.S. Provisional Application having Ser. No. 62/557,115, filed 11 Sep. 2017, which is incorporated by reference herein.

BACKGROUND

A bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include receiving a digital well plan; issuing drilling instructions for drilling a well based at least in part on the digital well plan; comparing acquired information associated with drilling of the well with well plan information of the digital well plan; and outputting results based at least in part on the comparing of the acquired information with the well plan information. A system can include one or more processors; memory operatively coupled to the one or more processors; and processor-executable instructions stored in the memory and executable by at least one of the one or more processors to instruct the system to: receive a digital well plan; issue drilling instructions for drilling a well based at least in part on the digital well plan; compare acquired information associated with drilling of the well with well plan information of the digital well plan; and output results based at least in part on the comparing of the acquired information with the well plan information. One or more computer-readable storage media can include computer-executable instructions executable to instruct a computing system to: receive a digital well plan; issue drilling instructions for drilling a well based at least in part on the digital well plan; compare acquired information associated with drilling of the well with well plan information of the digital well plan; and output results based at least in part on the comparing of the acquired information with the well plan information. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 19 illustrates an example of a GUI with an example of a table of information that can be included in a digital well plan.

DETAILED DESCRIPTION

Figure 1:
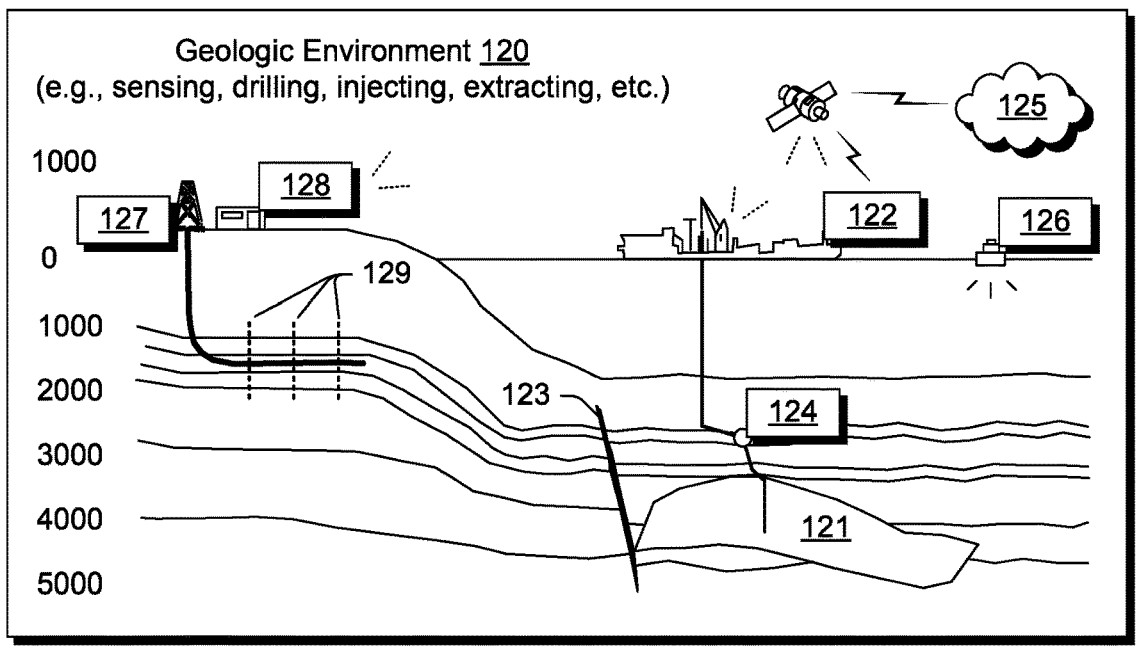
FIG. 1 illustrates examples of equipment in a geologic environment.
Figure 1:
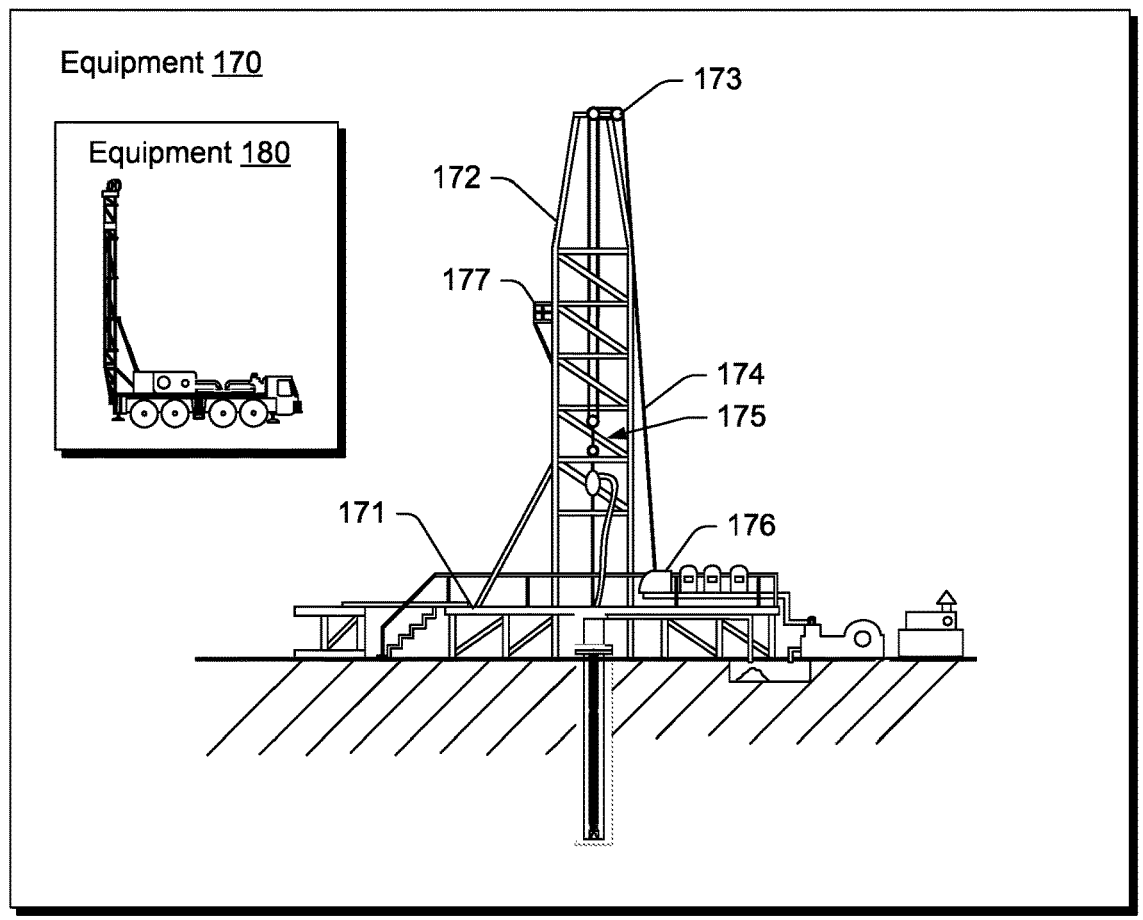

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom or, for example, to inject fluids into the reservoir; noting that a field may utilize one or more production wells and one or more injection wells.

As an example, constraints can be imposed on a design of a well, for example, a well trajectory may be constrained via one or more physical phenomena that may impact viability of a bore in earth, ease of drilling into earth, etc. Thus, for example, one or more constraints may be imposed based at least in part on known geology of a subterranean domain or, for example, presence of one or more other wells in the area (e.g., collision avoidance). As an example, one or more other constraints may be imposed, for example, consider one or more constraints germane to capabilities of tools being used and/or one or more constraints related to drilling time and risk tolerance.

As an example, drilling can commence according to a digital well plan where the drilling progresses along a portion of a trajectory of the digital well plan. In such an example, based on one or more types of information, a method can include rendering a graphical user interface to a display that allows for revising the digital well plan as to one or more portions of the trajectory that has yet to be drilled.

As an example, a well plan (e.g., a digital well plan) can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

As an example, states such as rigstates may be utilized in planning, implementation, diagnostics, automation, etc. For example, state information may be acquired and stored and/or analyzed. In such an example, analysis of state information may allow for making determinations as to whether a plan is being adequately followed, equipment is operating as expected, etc.

As an example, a well planning system may utilize a multiple factor approach where learning occurs based on information for a plurality of well that have been drilled, for example, according to one or more corresponding well plans. Such a system may include machine learning, which may utilize one or more models (e.g., neural network models, etc.). As an example, a trained model or models may be utilized for purposes of well plan generation, well plan revision and/or one or more other purposes. As an example, training may occur with respect to outcomes where an outcome may be classified as being beneficial or detrimental. In such an example, one or more factors may be associated with an outcome and, for example, an outcome itself may be a factor. Where a model is trained based on outcomes (e.g., and underlying factors), such a model may be utilized for purposes of well plan generation, revision, etc., where output may aim to increase likelihood of one or more positive outcomes and/or decrease likelihood of one or more negative outcomes. In such a context, positive generally refers to beneficial while negative generally refers to detrimental; noting that a difference between a planned factor value and actual factor value may be positive or may be negative, where such difference may have associated connotations (e.g., beneficial or detrimental). For example, a positive numeric difference (e.g., more time than planned) may be a negative outcome while a negative numeric difference (e.g., less time than planned) may be a beneficial outcome. While time is mentioned, it is presented as an example as other types of beneficial outcomes and detrimental outcomes may be identified and utilized for training, well plan generation, etc.

Various examples of types of environments, various examples of types of equipment and various examples of types of methods, operations, etc. are described below.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a wellsite and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
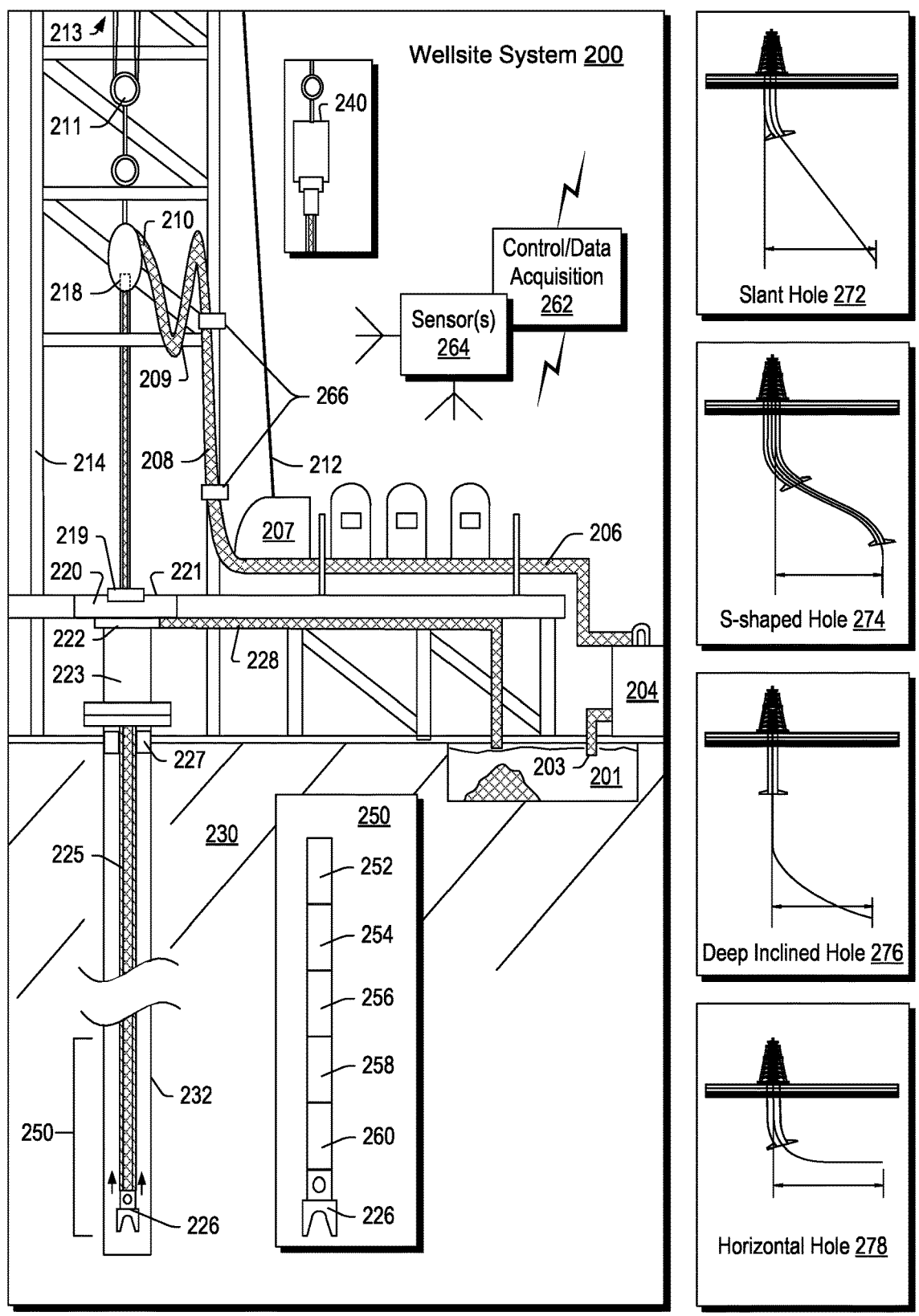
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
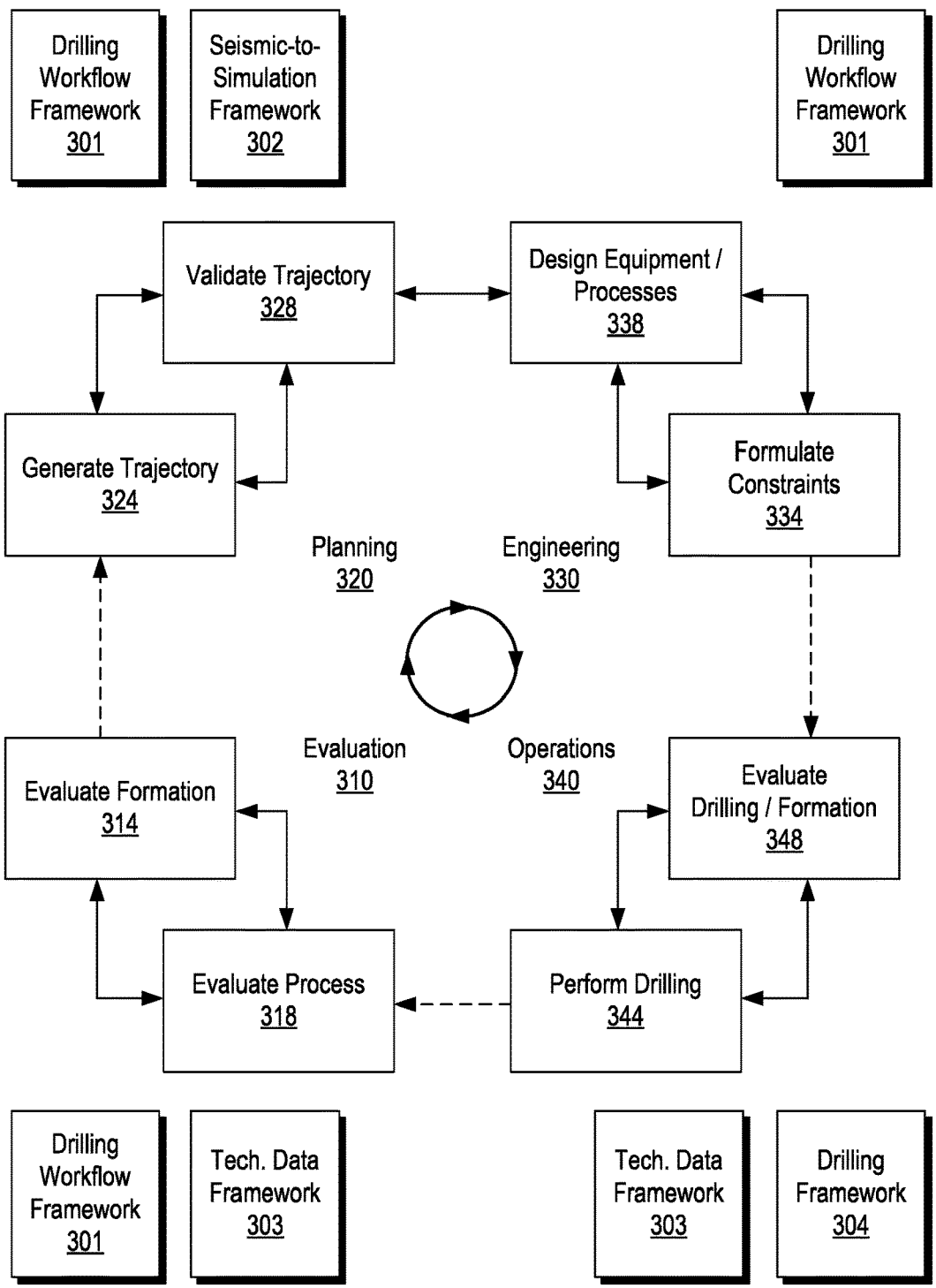
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on pre-defined classes, for example, to facilitate modeling, analysis, simulation, etc. An example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

The PETREL® framework can include components for implementation of a cognitive environment, which can include machine learning, training of machines and use of trained machines. As an example, the PETREL® framework can include one or more cloud-based components, for example, for purposes of computations, access, data storage, transmission of instructions to equipment, etc. A cloud framework may be included in a system that can provision and utilize resources (e.g., AZURE™ cloud framework (Microsoft Corp., Redmond, Wash.), etc.).

The PETREL® framework can be implemented to unite planning and operations, for example, consider one or more planning tasks performed via the framework and one or more planned tasks being executed during field operations. As an example, a framework can include issuing one or more instructions via one or more networks to one or more pieces of field equipment to cause such equipment to perform one or more operations (e.g., data acquisition, sensing, moving, fracturing, drilling, tripping, casing, lifting via gas lift equipment, lifting via pump equipment, etc.).

As an example, a framework can include components to automate and accelerate complex functions such as modeling, simulation, analysis, and forecasting. Such advanced computational capabilities can be based on insights from lab and/or field measurements, datasets across a range of diverse sources.

As an example, one or more frameworks may be inter-operative and/or run upon one or another. As an example, consider the OCEAN® framework environment (Schlumberger Limited, Houston, Tex.), which allows for integration of add-ons (or plug-ins) into a PETREL® framework workflow. The OCEAN® framework environment leverages various tools (e.g., hardware and software) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. In an example embodiment, an application may be considered a data-driven application. As an example, a framework can include components for model building and visualization. Such a model may include one or more grids. For example, a geologic region can be represented as a numerical model that includes one or more spatial grids that represent features, physics, etc., of the geologic region. Such a numerical model can be utilized for one or more purposes such as, for example, visualization, data acquisition, simulation, control, etc.

As an example, the model simulation layer may provide domain objects, act as a data source, provide for rendering and provide for various user interfaces. Rendering may provide a graphical environment in which applications can display their data while the user interfaces may provide a common look and feel for application user interface components. A user interface can be a graphical user interface (GUI) that is rendered to a display of a computing device or system. A GUI can be rendered based in part on execution of instructions by a processor or processors. As an example, a digital well plan can include instructions that can be utilized to render a GUI or GUIs. In such an example, the GUI or GUIs can include features for selection of information and/or one or more graphical controls (e.g., via a mouse, a stylus, a finger, voice command, etc.) where such selection can cause a computing device or system, locally and/or remotely, to perform one or more actions. As an example, one or more pieces of field equipment may be operatively coupled to one or more computing devices or systems, for example, via one or more interfaces (e.g., network interfaces, etc.). In such an example, one or more instructions may be issued to one or more pieces of equipment responsive to interactions with a GUI or GUIs that operate based at least in part on information in a digital well plan.

As an example, with respect to a model that is object-based, domain objects can include entity objects, property objects and optionally other objects. Entity objects may be used to geometrically represent wells or other equipment, surfaces, reservoirs, etc., while property objects may be used to provide property values as well as data versions and display parameters. For example, an entity object may represent a well where a property object provides log information as well as version information and display information (e.g., to display the well as part of a model). As an example, an entity object may represent a piece of equipment at a rigsite or a wellsite where information stored in a digital well plan may be utilized to control the piece of equipment. For example, consider a GUI that renders a graphical representation of the piece of equipment at a rigsite or a wellsite via an entity object to a display where a user can interact with the entity object and hence the piece of equipment at the rigsite or the wellsite. In such an example, the interaction may cause information to be transmitted to the piece of equipment where the information may include information of a digital well plan (e.g., a control command, a parameter value, etc.).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part via a framework, for example, consider a framework that operates directly and/or indirectly on seismic data, seismic attribute(s), log data, etc.

As an example, seismic data can be data acquired via a seismic survey where sources and receivers are positioned in a geologic environment to emit and receive seismic energy where at least a portion of such energy can reflect off subsurface structures. Seismic data can be referred to as seismic image data as it can be utilized to generate an image of a subsurface region.

Seismic reflection technology and techniques to image subsurface structure can involve performing one or more surveys where, for example, geometry of one or more sources and one or more receivers tend to be known (e.g., according to an acquisition geometry). As an example, seismic imaging can include processing of seismic image data utilizing one or more processors via a process akin to triangulation, though more complex, which aims to place reflections in their proper locations with (e.g., more-or-less) proper amplitudes, which can then be interpreted. In reflection seismology, the amplitudes tend to be indicative of relative changes in impedance, and, for a 3D spatial survey, a seismic volume (e.g., volumetric seismic image data) can be processed to yield impedances of subsurface material between reflecting boundaries.

As an example, a seismic data analysis framework or frameworks (e.g., consider the OMEGA® framework, Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a velocity model of a geologic region can include acoustic and/or elastic information (e.g., acoustic impedance and/or elastic impedance). Acoustic impedance is the product of density and seismic velocity, which varies among different rock layers, commonly symbolized by Z. The difference in acoustic impedance between rock layers affects the reflection coefficient. Elastic impedance is the product of the density of a medium and its shear wave velocity. As X-ray computed tomography depends on the X-ray attenuation coefficients as a material property of material imaged to generate pixel values that can be rendered as an image to a display, reflection seismology depends on material properties of material imaged to general pixel values that can be rendered as an image to a display. In other words, a rendered seismic image is an image that depends on properties of material in a geologic region that is imaged. Structural features such as beds, layers, geobodies, faults, etc., can be discerned through reflection seismology where such features can be utilized for model building, model refinement, planning, generation of a digital well plan, execution of a digital well plan, production of hydrocarbons from a reservoir, etc. As an example, seismic image data from reflection seismology of a geologic region can be inverted to generate a model or a refined model of the geologic region.

As an example, a framework may provide for modeling petroleum systems. For example, the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
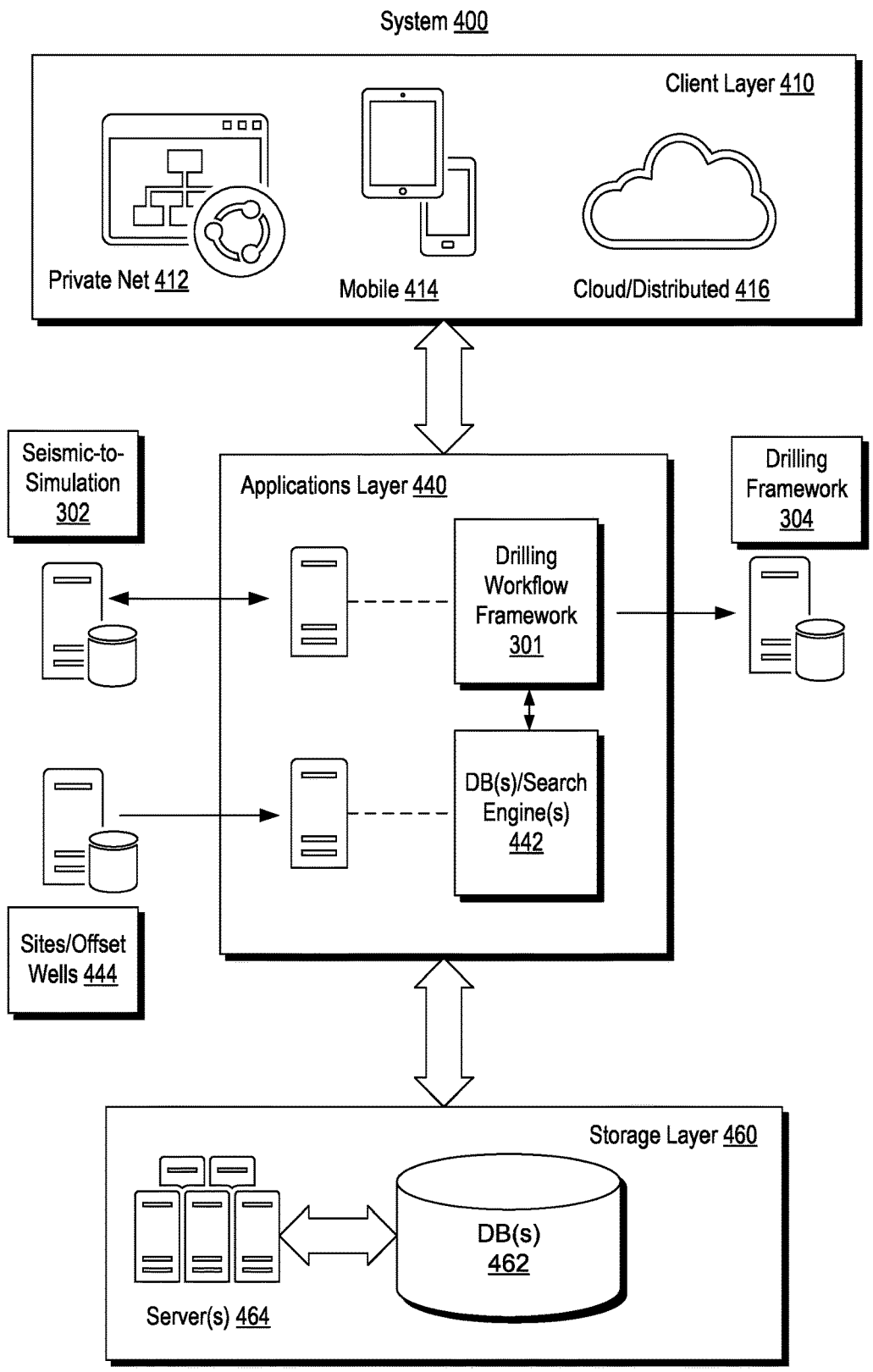
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. In the oil and gas industry, "E&P" is an acronym for exploration and production, which include performing various actions in the field. The STUDIO FIND™ search functionality can provide for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering. Geosteering can include intentional directional control of a well based on the results of downhole geological logging measurements, which may be used alternatively or additionally to multi-dimensional targets in space. As an example, geosteering may be used to keep a borehole in a particular section of a reservoir to minimize gas or water breakthrough and maximize economic production from a completed well.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
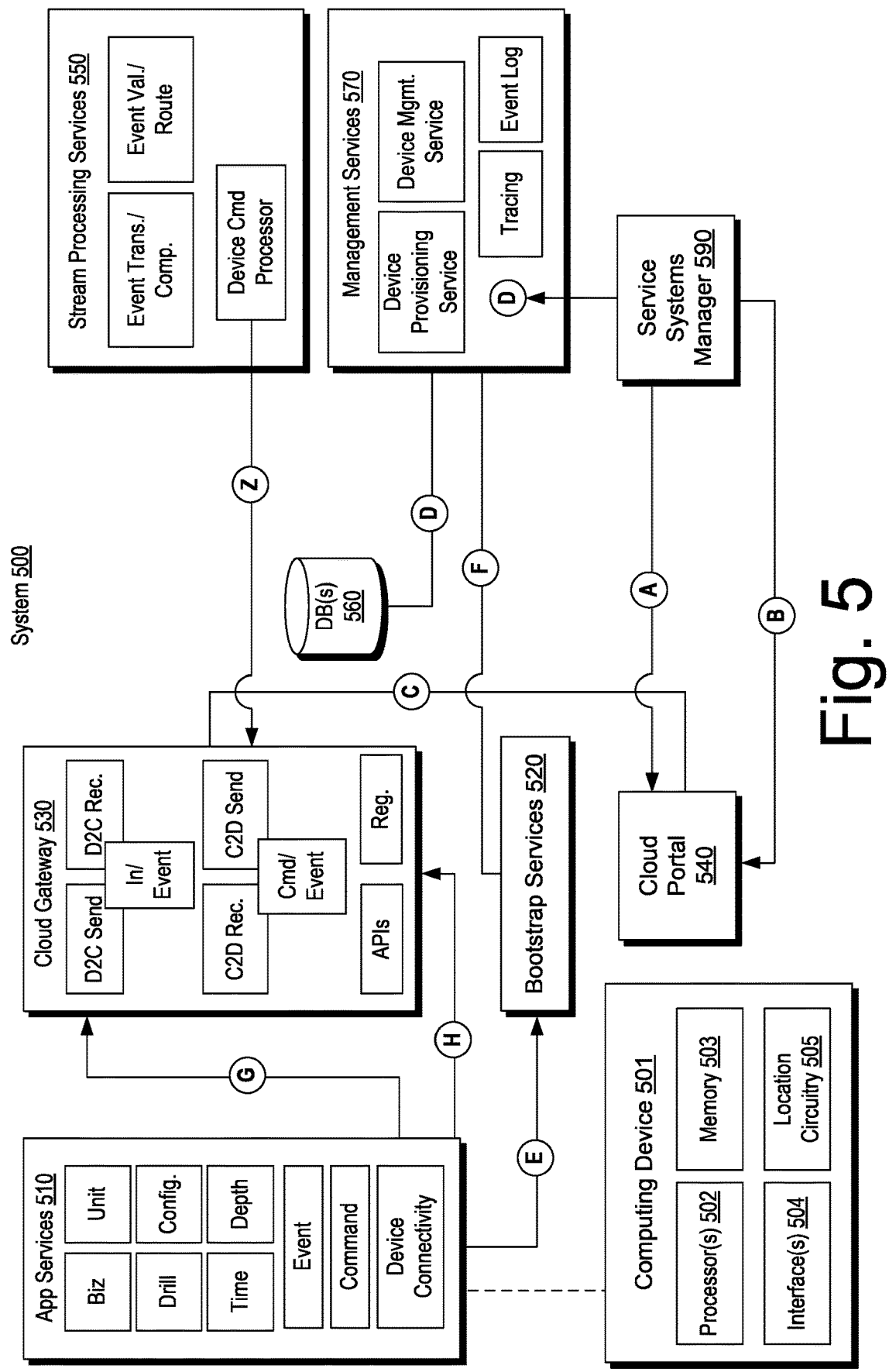
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include Wi-Fi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE™ .NET SDK with the Service Bus, .NET libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of rig acquisition system and/or data delivery.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, an architecture utilized in a system such as, for example, the system 500 may include features of the AZURE™ architecture. As an example, the cloud portal block 540 can include one or more features of an AZURE™ portal that can manage, mediate, etc., access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
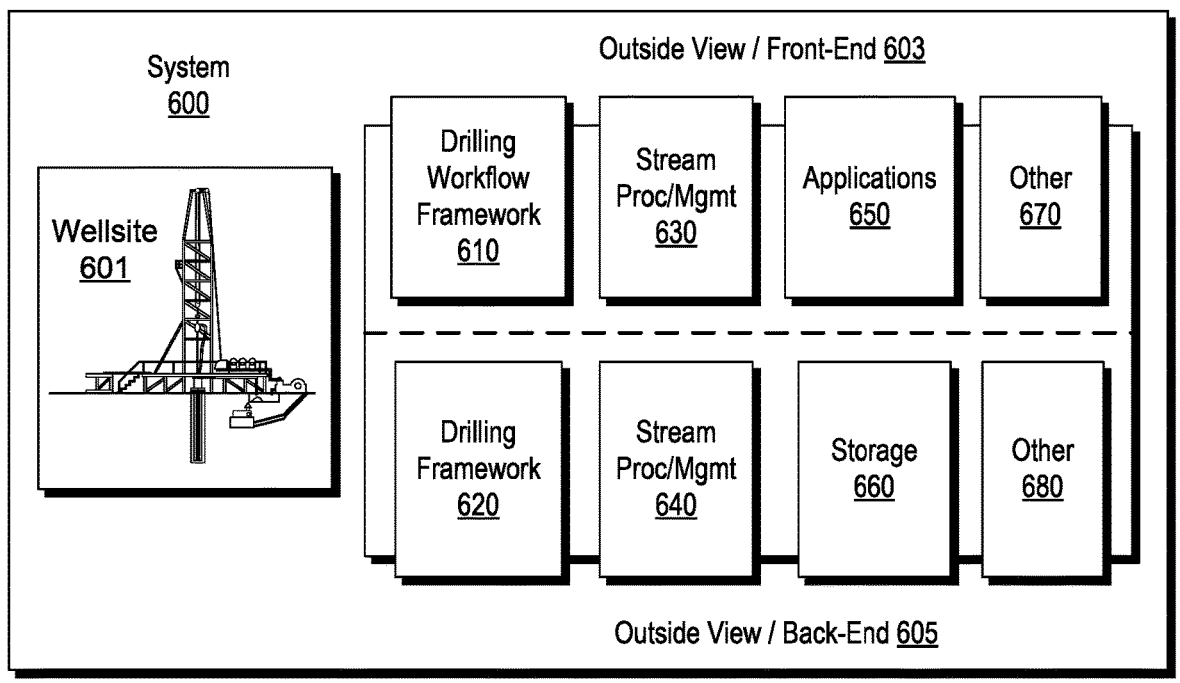
FIG. 6 illustrates an example of a system and an example of a scenario.
Figure 6:
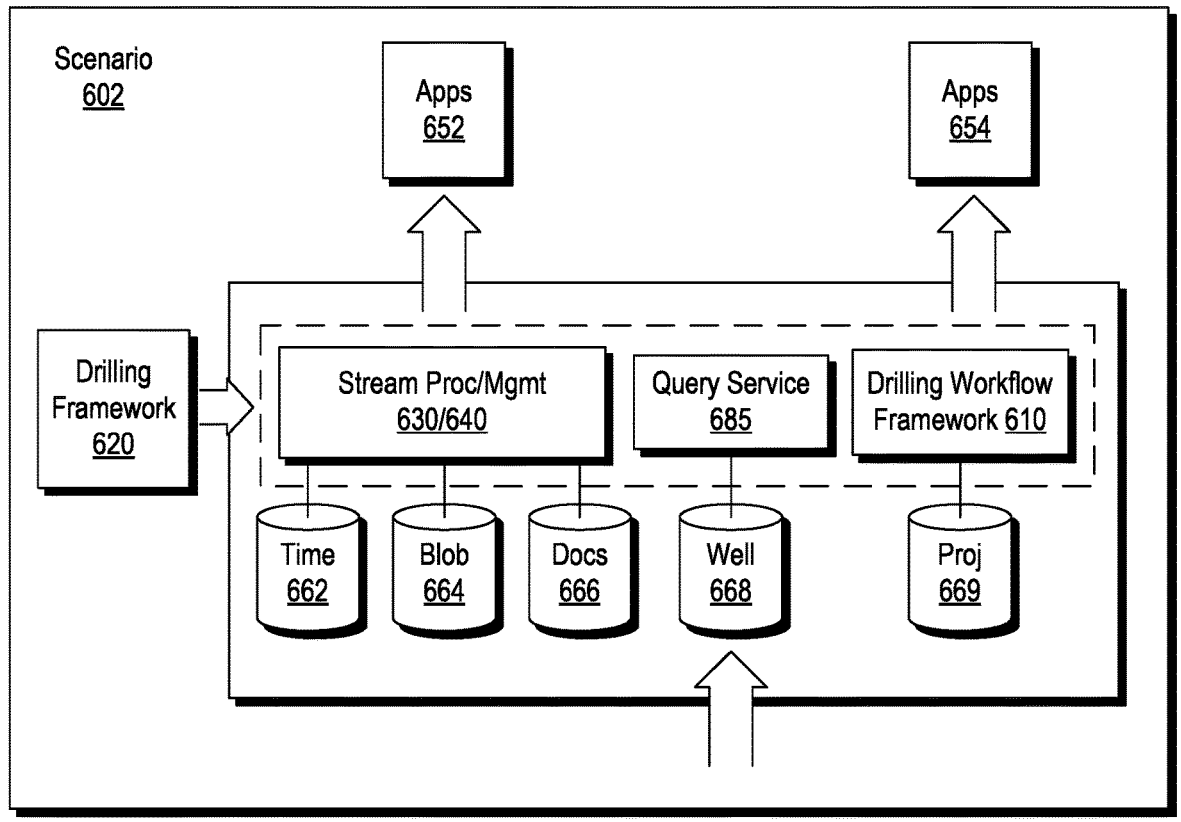

FIG. 6 shows an example of a system 600 associated with an example of a wellsite system 601 and also shows an example scenario 602. As shown in FIG. 6, the system 600 can include a front-end 603 and a back-end 605 from an outside or external perspective (e.g., external to the wellsite system 601, etc.). In the example of FIG. 6, the system 600 includes a drilling framework 620, a stream processing and/or management block 640, storage 660 and optionally one or more other features 680 that can be defined as being back-end features. In the example of FIG. 6, the system 600 includes a drilling workflow framework 610, a stream processing and/or management block 630, applications 650 and optionally one or more other features 670 that can be defined as being front-end features.

As an example, a user operating a user device can interact with the front-end 603 where the front-end 603 can interact with one or more features of the back-end 605. As an example, such interactions may be implemented via one or more networks, which may be associated with a cloud platform (e.g., cloud resources, etc.).

As to the example scenario 602, the drilling framework 620 can provide information associated with, for example, the wellsite system 601. As shown, the stream blocks 630 and 640, a query service 685 and the drilling workflow framework 610 may receive information and direct such information to storage, which may include a time series database 662, a blob storage database 664, a document database 666, a well information database 668, a project(s) database 669, etc. As an example, the well information database 668 may receive and store information such as, for example, customer information (e.g., from entities that may be owners of rights at a wellsite, service providers at a wellsite, etc.). As an example, the project database 669 can include information from a plurality of projects where a project may be, for example, a wellsite project.

As an example, the system 600 can be operable for a plurality of wellsites, which may include active and/or inactive wellsites and/or, for example, one or more planned wellsites. As an example, the system 600 can include various components of the system 300 of FIG. 3. As an example, the system 600 can include various components of the system 400 of FIG. 4. For example, the drilling workflow framework 610 can be a drilling workflow framework such as the drilling workflow framework 301 and/or, for example, the drilling framework 620 can be a drilling framework such as the drilling framework 304.

Figure 7:
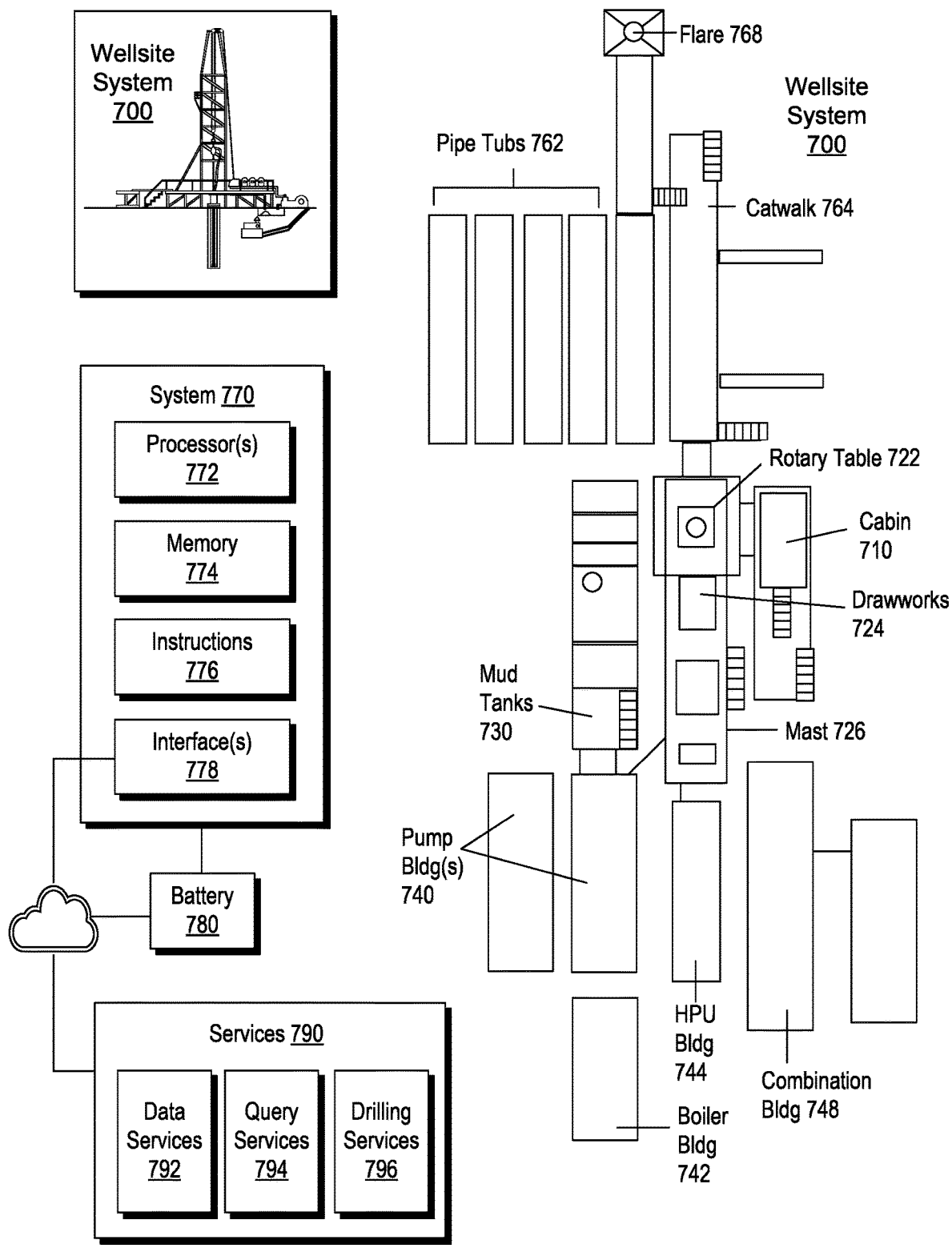
FIG. 7 illustrates an example of a wellsite system.

FIG. 7 shows an example of a wellsite system 700, specifically, FIG. 7 shows the wellsite system 700 in an approximate side view and an approximate plan view along with a block diagram of a system 770.

In the example of FIG. 7, the wellsite system 700 can include a cabin 710, a rotary table 722, drawworks 724, a mast 726 (e.g., optionally carrying a top drive, etc.), mud tanks 730 (e.g., with one or more pumps, one or more shakers, etc.), one or more pump buildings 740, a boiler building 742, a hydraulic power unit (HPU) building 744 (e.g., with a rig fuel tank, etc.), a combination building 748 (e.g., with one or more generators, etc.), pipe tubs 762, a catwalk 764, a flare 768, etc. Such equipment can include one or more associated functions and/or one or more associated operational risks, which may be risks as to time, resources, and/or humans.

As shown in the example of FIG. 7, the wellsite system 700 can include a system 770 that includes one or more processors 772, memory 774 operatively coupled to at least one of the one or more processors 772, instructions 776 that can be, for example, stored in the memory 774, and one or more interfaces 778. As an example, the system 770 can include one or more processor-readable media that include processor-executable instructions executable by at least one of the one or more processors 772 to cause the system 770 to control one or more aspects of the wellsite system 700. In such an example, the memory 774 can be or include the one or more processor-readable media where the processor-executable instructions can be or include instructions. As an example, a processor-readable medium can be a computer-readable storage medium that is not a signal and that is not a carrier wave.

FIG. 7 also shows a battery 780 that may be operatively coupled to the system 770, for example, to power the system 770. As an example, the battery 780 may be a back-up battery that operates when another power supply is unavailable for powering the system 770. As an example, the battery 780 may be operatively coupled to a network, which may be a cloud network. As an example, the battery 780 can include smart battery circuitry and may be operatively coupled to one or more pieces of equipment via a SMBus or other type of bus.

In the example of FIG. 7, services 790 are shown as being available, for example, via a cloud platform. Such services can include data services 792, query services 794 and drilling services 796. As an example, the services 790 may be part of a system such as the system 300 of FIG. 3, the system 400 of FIG. 4 and/or the system 600 of FIG. 6.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 8:
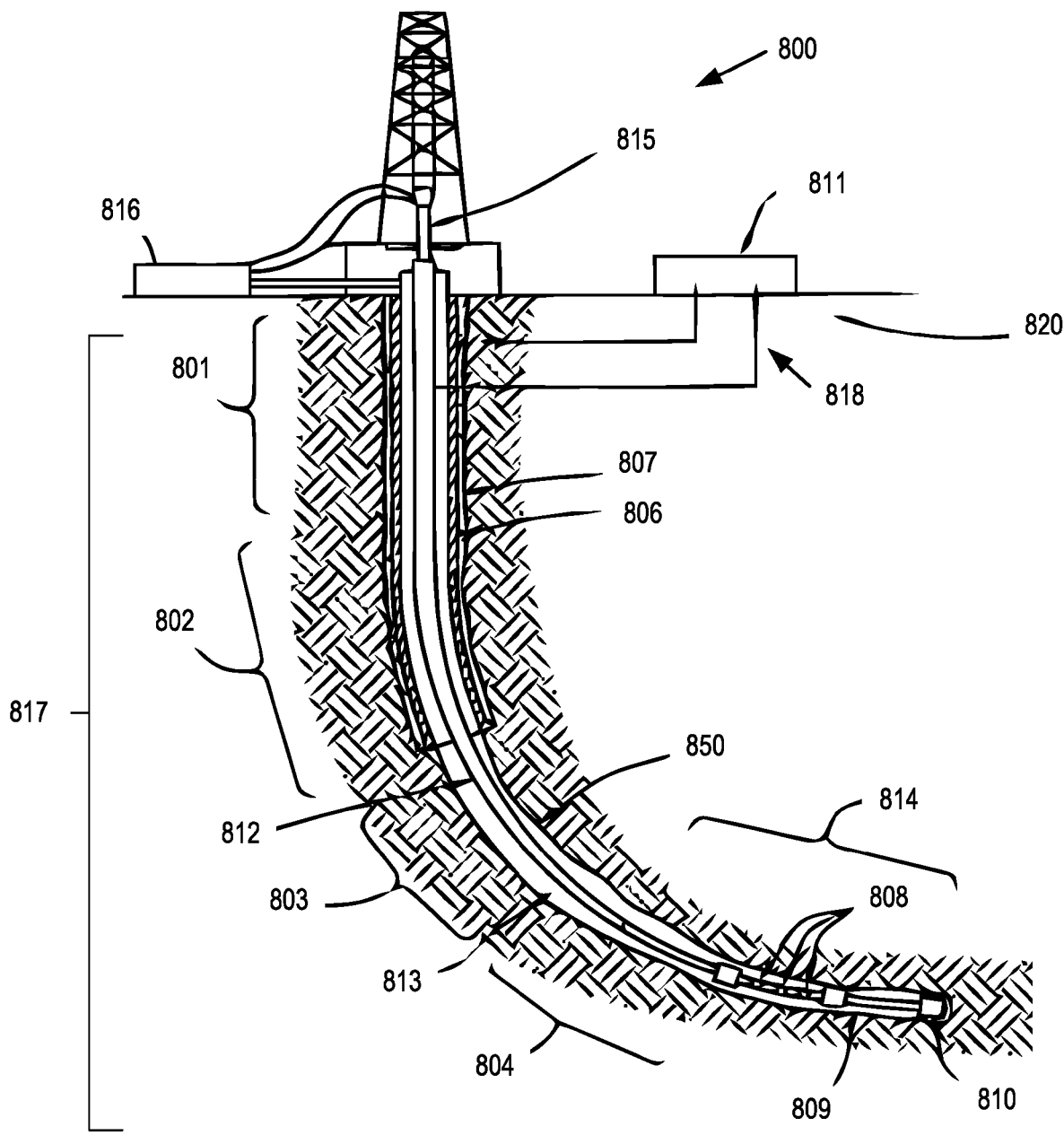
FIG. 8 illustrates an example of a system.

FIG. 8 shows a schematic diagram depicting an example of a drilling operation of a directional well in multiple sections. As an example, one or more actions performed during drilling of the directional well can be performed using information in a digital well plan. The drilling operation depicted in FIG. 8 includes a wellsite drilling system 800 and a field management tool 820 for managing various operations associated with drilling a bore hole 850 of a directional well 817. The wellsite drilling system 800 includes various components (e.g., drillstring 812, annulus 813, bottom hole assembly (BHA) 814, kelly 815, mud pit 816, etc.). As shown in the example of FIG. 8, a target reservoir may be located away from (as opposed to directly under) the surface location of the well 817. In such an example, special tools or techniques may be used to ensure that the path along the bore hole 850 reaches the particular location of the target reservoir.

As an example, the BHA 814 may include sensors 808, a rotary steerable system 809, and a bit 810 to direct the drilling toward the target reservoir guided by a pre-determined survey program for measuring location details in the well. As an example, a digital well plan can include trajectory information that can be used for guiding the bit 810 to the target reservoir. As an example, the subterranean formation through which the directional well 817 is drilled may include multiple layers (not shown) with varying compositions of material, geophysical characteristics, and geological conditions. Both the drilling planning during the well design stage and the actual drilling according to the drilling plan in the drilling stage may be performed in multiple sections (e.g., sections 801, 802, 803 and 804) corresponding to the multiple layers in the subterranean formation. For example, certain sections (e.g., sections 801 and 802) may use cement 807 reinforced casing 806 due to the particular formation compositions, geophysical characteristics, and geological conditions.

In the example of FIG. 8, a surface unit 811 may be operatively linked to the wellsite drilling system 800 and the field management tool 820 via communication links 818. The surface unit 811 may be configured with functionalities to control and monitor the drilling activities by sections in real-time via the communication links 818. The field management tool 820 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 818 according to a drilling operation workflow. The communication links 818 may include a communication subassembly. As an example, the field management tool 820 can include one or more features of the system 770 of the example of FIG. 7 (see, e.g., the processor(s) 772, the memory 774, the instructions 776, the interface(s) 778, etc.).

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

Figure 9:
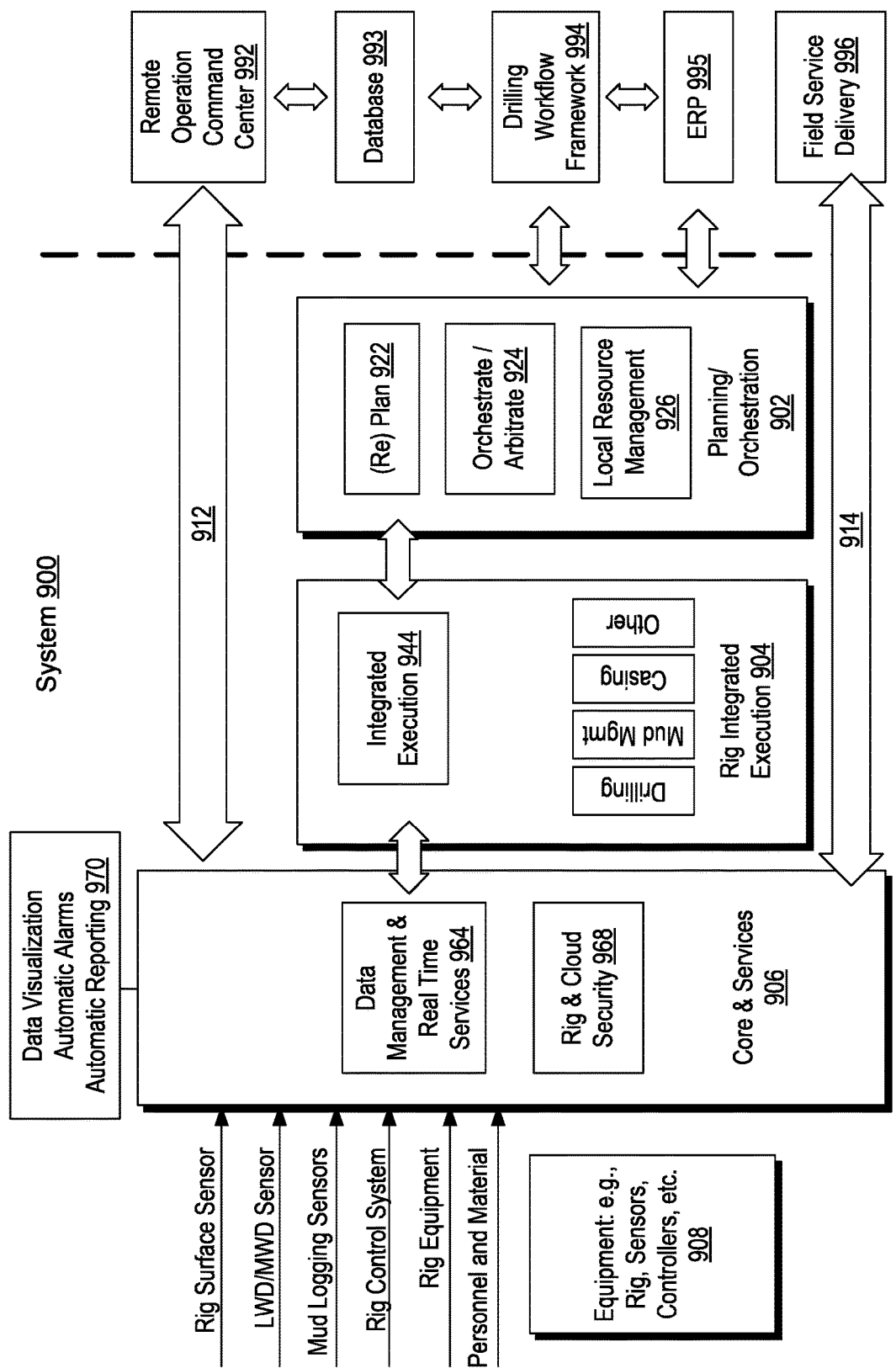
FIG. 9 illustrates an example of a system.

FIG. 9 shows an example of a system 900 that includes various components that can be local to a wellsite and includes various components that can be remote from a wellsite. As shown, the system 900 includes a block 902, a block 904, a block 906 and an equipment block 908. These blocks can be labeled in one or more manners other than as shown in the example of FIG. 9. In the example of FIG. 9, the blocks 902, 904, 906 and 908 can be defined by one or more of operational features, functions, relationships in an architecture, etc.

As an example, the block 902 can be associated with a well management level (e.g., well planning and/or orchestration) and can be associated with a rig management level (e.g., rig dynamic planning and/or orchestration). As an example, the block 904 can be associated with a process management level (e.g., rig integrated execution). As an example, the block 906 can be associated with a data management level (e.g., sensor, instrumentation, inventory, etc.). As an example, the equipment block 908 can be associated with a wellsite equipment level (e.g., wellsite subsystems, etc.).

In the example of FIG. 9, the block 902 includes a plan/replan block 922, an orchestrate/arbitrate block 924 and a local resource management block 926. In the example of FIG. 9, the block 904 includes an integrated execution block 944, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 9, the block 906 includes a data management and real-time services block 964 (e.g., real-time or near real-time services) and a rig and cloud security block 968. In the example of FIG. 9, the equipment block 908 is shown as being capable of providing various types of information to the block 906. For example, consider information from a rig surface sensor, a LWD/MWD sensor, a mud logging sensor, a rig control system, rig equipment, personnel, material, etc. In the example, of FIG. 9, a block 970 can provide for one or more of data visualization, automatic alarms, automatic reporting, etc. As an example, the block 970 may be operatively coupled to the block 906 and/or one or more other blocks.

As mentioned, a portion of the system 900 can be remote from a wellsite. For example, to one side of a dashed line appear a remote operation command center block 992, a database block 993, a drilling workflow framework block 994, an enterprise resource planning (ERP) block 995 and a field services delivery block 996. Various blocks that may be remote can be operatively coupled to one or more blocks that may be local to a wellsite system. For example, a communication link 912 is illustrated in the example of FIG. 9 that can operatively couple the blocks 906 and 992 (e.g., as to monitoring, remote control, etc.), while another communication link 914 is illustrated in the example of FIG. 9 that can operatively couple the blocks 906 and 996 (e.g., as to equipment delivery, equipment services, etc.). Various other examples of possible communication links are also illustrated in the example of FIG. 9.

In the example of FIG. 9, various blocks can be components that may correspond to one or more software instruction sets (e.g., processor-executable instructions, add-ons, plug-ins, etc.), hardware infrastructure, firmware, equipment, or a combination thereof. Communication between the components may be local or remote, direct or indirect, via application programming interfaces, and procedure calls, or through one or more communication channels.

As an example, the block 906 (e.g., a core and services block) can include functionality to manage individual pieces of equipment and/or equipment subsystems. As an example, such a block can include functionality to handle basic data structure of the oilfield, such as the rig, acquire metric data, produce reports, and manages resources of people and supplies. As an example, such a block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components and sensor and acquire data. As an example, a data acquirer and aggregator may further include functionality to interface with sensors located at the oilfield.

As an example, a rig state identifier can includes functionality to obtain data from the data acquirer and aggregator and transform the data into state information. As an example, state information may include health and operability of a rig as well as information about a particular task being performed by equipment.

As an example, RT drill services can include functionality to transmit and present information to individuals. In particular, the RT drill services can include functionality to transmit information to individuals involved according to roles and, for example, device types of each individual (e.g., mobile, desktop, etc.). In one or more embodiments, information presented by RT drill services can be context specific, and may include a dynamic display of information so that a human user may view details about items of interest.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

In the example of FIG. 9, the equipment block 908 can correspond to various controllers, control unit, control equipment, etc. that may be operatively coupled to and/or embedded into physical equipment at a wellsite such as, for example, rig equipment. For example, the equipment block 908 may correspond to software and control systems for individual items on the rig. As an example, the equipment block 908 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

As an example, a system can include a framework that can acquire data such as, for example, real-time data associated with one or more operations such as, for example, a drilling operation or drilling operations. As an example, consider the PERFORM™ toolkit framework (Schlumberger Limited, Houston, Tex.).

As an example, a service can be or include one or more of OPTIDRILL™, OPTILOG™ and/or other services marketed by Schlumberger Limited, Houston, Tex.

The OPTIDRILL™ technology can help to manage downhole conditions and BHA dynamics as a real-time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO™ framework).

The OPTILOG™ technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Tex.), which may include information from various operations (e.g., drilling operations) as associated with various drill bits, drilling conditions, formation types, etc.

As an example, one or more QTRAC services (Schlumberger Limited, Houston Tex.) may be provided for one or more wellsite operations. In such an example, data may be acquired and stored where such data can include time series data that may be received and analyzed, etc.

As an example, one or more M-I SWACO™ services (M-I L.L.C., Houston, Tex.) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX™ services (e.g., via the ONE-TRAX software platform, M-I L.L.C., Houston, Tex.) may be provided for one or more wellsite operations. In such an example, data may be acquired and stored where such data can include time series data that may be received and analyzed, etc.

As mentioned, for a project that aims to develop or further develop a reservoir, a method can include generating a set of possible trajectories, which may be referred to as a set of candidate trajectories, and interrogating one or more of the candidates with respect to one or more performance indicators (PIs).

As an example, a wellbore trajectory can be defined as a geometric trace that connects a well surface location and one or more target locations. As an example, when a wellbore trajectory is designed by a drilling engineer, several rules (e.g., performance indicators (PIs)) may be specified that the trajectory may be expected to follow. For example, consider one or more of a kickoff point that is to be below a mudline, collision avoidance with one or more existing wells, and dogleg severity (DLS), which may be provided as an indicator of an ability for drilling tools to turn, not get stuck, etc.

As an example, a method may be implemented as an automated or semi-automated way to design one or more trajectories. As an example, a method may design a single trajectory or a group of trajectories, for example, without collision avoidance. As an example, a method can include modeling one or more trajectories as a multi-objective optimization problem. For example, PIs can be utilized as cost functions and rules as constraints.

As an example, a multi-objective optimization problem can be solved using a Pareto frontier approach (e.g., as to generation, filtering, etc. of candidate trajectories). A planning objective can be to design a well trajectory that is drillable with its PIs being the "best" possible; in other words, a planning objective can be to determine a planned trajectory that can be drilled with some assurances of low cost and risk. In a multi-objective optimization problem approach, complexity can mean that a unique solution may not exist. In the context of trajectory planning, complexity can arise due to PIs that may contradict each other. For example, less DLS and less total depth can be two PIs; however, less DLS can result in a greater total depth. In such a scenario, a trade-off may be made that aims to favor one over the other. In a Pareto frontier approach, a Pareto efficient set of candidate trajectories can be a set where associated PIs for individual members of the set are not "worse" than those of other individual members of the set. As an example, a Pareto efficient set may be determined using an iterative process that can include, for example, implementation of one or more evolutionary processes, which may provide for a more global solution.

As an example, the Pareto principle may be explained as an 80-20 phenomenon, where around 80 percent of effects result from around 20 percent of the causes. As an example, an approach can include analysis of information that can be considered as lying outside the Pareto curve, which may include relatively rare events, which may have effects on an undetermined scale. For example, a method can include analyzing information from drilling operations for a so-called "black swan" or "black swans", which may pertain to particular scenario that can be characterized generally according to a Pareto frontier.

In terms of a characterization approach, a black swan can be characterized based on one or more of a scenario being: a rare event that is beyond the realm of ordinary expectations (e.g., as in Pareto principle); having a generally non-computable probability using scientific methods (owing to the nature of small probabilities); and associated with a psychological bias as to uncertainty and to a rare event's role in operational outcomes.

Figure 10:
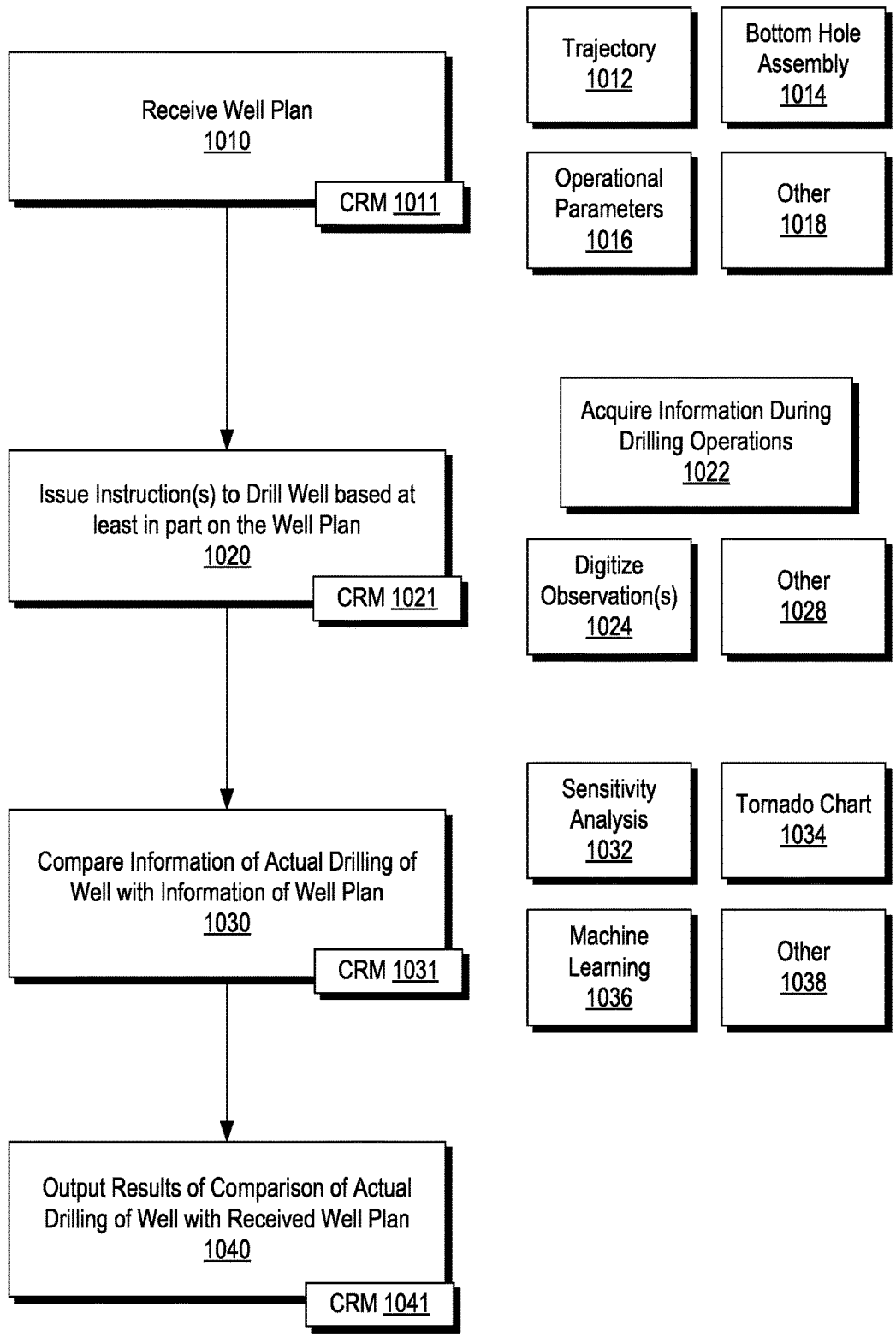
FIG. 10 illustrates an example of a method.

FIG. 10 shows an example of a method 1000 that includes a reception block 1010 for receiving a well plan (e.g., a digital well plan via a network interface, etc.), an issue block 1020 for issuing at least one instruction to drill the well based at least in part on the well plan (e.g., one or more control instructions in the digital well plan, etc.), a comparison block 1030 for comparing acquired information of actual drilling of the well with information of the well plan (e.g., at least in part via receipt of digital information and comparison to digital information of the well plan in digital form), and an output block 1040 for outputting results of the comparison (e.g., storing information based on the comparison to a digital storage medium or media).

As an example, the method 1000 can include, per block 1010, receiving a digital well plan; per block 1020, issuing drilling instructions for drilling a well based at least in part on the digital well plan; per block 1030, comparing acquired information associated with drilling of the well with well plan information of the digital well plan; and per block 1040, outputting results based at least in part on the comparing of the acquired information with the well plan information.

As shown in the example of FIG. 10, the reception block 1010 can include receiving trajectory information 1012, receiving bottom hole assembly (BHA) information 1014, receiving operational parameters (e.g., and/or operational parameter values) 1016 and optionally receiving one or more other types of information 1018. Such information can be part of a digital well plan that can be stored in a digital medium or media and, for example, received by a computing system via an interface, which may be a network interface.

As shown in the example of FIG. 10, the issue block 1020 can include acquiring information during one or more drilling operations 1022, digitizing observations 1024 and/or one or more other forms of information acquisition. In the example of FIG. 10, the acquired information during drilling operation 1022 can include information associated with one or more of the types of information of blocks 1012, 1014,

1016 and 1018. As an example, information may be for a formation, an operation, a piece of equipment, an amount of time for an operation, an amount of time that is not for an operation (e.g., an amount of non-productive time (NPT), etc.), etc.

As shown in the example of FIG. 10, the comparison block 1030 may include performing a sensitivity analysis 1032, generating a chart 1034 (e.g., consider a tornado chart, etc.), performing machine learning 1036 (e.g., neural network model-based learning, etc. to generate a trained machine model) and/or one or more other types of comparison analyses. As an example, an analysis may aim to determine what type equipment, operational parameters, etc. led to a favorable condition(s) and/or to an unfavorable condition(s). For example, where sticking is an unfavorable condition, a machine learning approach may analyze various factors using a trained machine model of drilling a well in a formation to identify a most probable cause of the sticking (e.g., BHA related cause, drilling fluid related cause, rate of penetration related cause, etc.). Thus, a comparison result may be based on an analysis that is more involved than comparison of two numbers (e.g., a planned number versus an actual number). As an example, comparison results can include involved analysis results and comparison of numeric values results. As an example, where machine learning is utilized, a machine learning model can learn based on results from performing analyses of planned versus actual results to generate a trained machine model. As an example, an analysis may include performing one or more statistical analyses, which may be in addition to a machine learning approach and/or one or more other analyses. In the example of FIG. 10, the comparison block 1030 can be automated by one or more computing systems.

As to a machine learning approach, as an example, one or more artificial neural networks (ANNs) can be constructed according to an architecture that includes nodes or neurons and may include layers and/or other features. ANNs include interconnections between various neurons and can include discrete layers, connections, and directions of data propagation.

As an example, an ANN can take input from an operation or operations and feed the input to a first layer of the ANN where, in the first layer, individual neurons can pass the data to a second layer. In such an example, the second layer of neurons can perform one or more tasks and pass along information to a next layer, which may be another intermediate layer or a final layer, where a result or results are output.

In an ANN, each neuron can assign a weighting to its input, for example, an indication as to how "true" or "false" it is relative to the task being performed. The final output can be determined by a total of those weightings. As an example, consider attributes of a condition such as sticking during drilling (e.g., stuck pipe condition) being processed by neurons, which may consider aspects such as length of pipe, diameter of pipe, mud-flow rate, severity of a trajectory (e.g., dogleg severity (DLS)), weight on bit (WOB), etc. The ANN's task can be to conclude whether the input is indicative of sticking or not. The ANN can generate a probability vector that is based on weightings. For example, the output from an ANN might be a confidence number or confidence numbers, where possible other outcomes exist (e.g., 86 percent confident the input is not indicative of sticking).

In the foregoing example, during use, if the ANN fails to output high confidence percentages to input associated with sticking, the ANN may be lacking in its training. In other words, if the ANN was trained using poor quality input and/or poor labelling of features in that input, then the ANN may be expected to perform poorly when implemented for purposes of recognition of sticking of drill pipe during a drilling operation.

Training of an ANN can be a complex process, particularly as to accessing appropriate training data. As an example, training data may be accessed and/or generated using one or more techniques. For example, consider a model of a drilling operation that can be utilized to generate training data for inputs that lead to model-based results that include sticking. As an example of real training data, consider a database of drilling data and outcomes where the outcomes include sticking. Such a database may be accessed for purposes of training a machine model such as an ANN. As an example, a machine model can be local for a particular field where the field can include offset wells such that, as wells are drilled, information from those drilling operations and associated outcomes can be utilized for purposes of training a machine model to generate a trained machine model, which may be updated as the number of wells in the field increases. In such an example, modelling such as simulation of drilling can be performed to generate training data, where modelling may optionally be updated to be more accurate as information is acquired from drilling operations (e.g., as to conditions, layers, material, etc.). Depending on architecture, an ANN may demand thousands of input/outcome sets of training data until the weightings of the neuron inputs are tuned precisely such that a "trained" ANN is generated. In the foregoing example, a properly trained ANN "knows", through appropriate training, what input is likely to give rise to an outcome (e.g., sticking, etc.).

As the number of neurons and layers increase, an ANN may be referred to as a "deep" ANN, which demands deep learning. Deep learning can be defined as, for example, a class of machine learning algorithms that: (a) use a cascade of multiple layers of nonlinear processing units for feature extraction and transformation where each successive layer uses the output from the previous layer as input; (b) learn in supervised (e.g., classification) and/or unsupervised (e.g., pattern analysis) manners; and (c) learn multiple levels of representations that correspond to different levels of abstraction where the levels form a hierarchy of concepts.

As an example, a framework can include one or more features of the TENSORFLOW framework (Google, Mountain View, Calif.) framework, which includes a software library for dataflow programming that provides for symbolic mathematics, which may be utilized for machine learning applications such as artificial neural networks (ANNs), etc.

As an example, a digital well plan can include information that can correspond to information germane to a machine model. For example, consider a digital well plan that includes specifications of a BHA utilized to drill a well. As an example, a machine model can include an architecture with one or more nodes (e.g., neurons) that can process one or more BHA specifications as part of an analysis to output information as to an outcome or outcomes. As an example, a digital well plan can include information that can be utilized in a simulation of drilling a well. In such an example, information generated during the simulation can be input to a trained machine model, which can, for example, output information as to one or more outcomes. For example, consider a simulation that outputs information that can be utilized as input to a trained machine model for purposes of determining likelihood of sticking. In such an example, output from the trained machine model may be utilized to revise the digital well plan, for example, prior to or before implementation of one or more portions of the digital well plan (e.g., for a particular section of a well, etc.). As an example, where multiple offset wells are to be drilled, information output by a trained machine model may be utilized to generate and/or revise a digital well plan for one or more of the multiple offset wells.

As an example, output from a trained machine model can provide information as to whether a scenario may be outside of a Pareto scenario. In such an example, a method can include determining whether the scenario includes indicia of a "black swan" scenario, as may be in a database that includes information from actual drilling operations and/or information from simulated drilling scenarios.

As an example, the comparison block 1030 of the method 1000 can include time for time analyses (e.g., as to productive time, non-productive time, etc.). As an example, time and actual physical parameters may allow for comparison results to indicate wear of one or more pieces of equipment. In such an example, the wear may be taken into account when planning another well that is to be drilled using one or more pieces of equipment that were used to drill the well (e.g., and/or one or more other wells). As an example, comparison results may be stored in association with one or more pieces of equipment such as, for example, a piece or pieces of a bottom hole assembly, which may be tagged using one or more techniques, technologies, etc. For example, a piece of equipment may include an RFID, a bar code or other type of identifier. In such an example, upon use of the piece of equipment, storage of the piece of equipment, movement of the piece of equipment, a reader may identify the piece of equipment and access its history, which can include prior location(s), wear and/or one or more other performance related types of information. Such information may optionally be input to a computing system for purposes of planning a well, drilling a well, revising a well plan, etc.

As mentioned, one or more machine learning approaches may be utilized. As to the comparison block 1030, the machine learning block 1036 can include implementing one or more machine models, for example, as in training one or more machine models and/or use of one or more trained machine models.

As to the output block 1040, in the example of FIG. 10, the results may be output in one or more manners. As an example, results may be output in a batch manner, for example, once drilling has been completed for the well according to the well plan and/or in a manner that occurs during drilling of the well. As to the latter, the comparison block 1030 may be implemented during the drilling of the well per the issue block 1020 such that results are generated and optionally output in real-time or near-real-time. In such an example, the well plan may optionally be revised based at least in part on the comparison results or a portion thereof. As an example, the method 1000 of FIG. 10 may be part of a real-time control system for drilling of a well at least in part according to a digital well plan.

As to the method 1000 of FIG. 10, at some point in time, the planned well is drilled, which can be in a manner that deviates from an initially received well plan due to one or more circumstances, which can include learning from comparison(s) of deviation(s) from the initially received well plan and actually drilling (e.g., which may include associating drilling operations with favorable productive time and/or unfavorable non-productive time, or factors that lead to a reduction in unfavorable non-productive time). Once drilled, comparison results for the drilled well may be classified as comparison results for planned versus actual for the drilled well; noting that such results may be output and stored as partial results during actual drilling of the well. At one or more points in time, the comparison results for the well may be considered comparison results for an "offset well" with respect to another well, which may be a well that has yet to be drilled or that has commenced drilling. In such an example, as explained below, the comparison results can be utilized for generating and/or revising a well plan for another well or wells.

As an example, a GUI can include a scene of a subterranean environment where a trajectory can be rendered, for example, as a graphic from a surface location to a target location.

As an example, a method may be implemented in a manner that allows a user to interact with a computing system to investigate one or more adjustments to a well plan that is under design or that is being utilized for drilling.

As an example, a method can include utilization of one or more performance indicators (PIs) where a PI can include one or more of total length of a trajectory, a maximum rate of curvature (dogleg severity) of a trajectory, a depth of a kick-off point, a measure of an anti-collision risk (e.g., such as an oriented separation factor), a measure of a size of a mud-weight window, a measure of an average friction along a bore, etc.

As an example, one or more constraints can include one or more of a minimum depth of a kick-off point constraint, a maximum allowable anti-collision risk constraint, a maximum allowable rate of curvature of a trajectory constraint, a maximum allowable rate of curvature of a trajectory as a function of depth constraint, etc.

As an example, a constraint may be a physical constraint and/or a rights constraint. As an example, a physical constraint may pertain to one or more formation characteristics. As an example, a rights constraint may pertain to property and/or resource rights, which may be defined by a physical boundary or physical boundaries. For example, rights may pertain to one or more leasehold rights, one or more leaselines, etc. Such a type of constraint may be implemented as a physical boundary or physical boundaries and/or as a time factor or time factors, where a right or rights may be associated with time (e.g., consider a development time, a production time, etc.).

In the example of FIG. 10, the output of the output block 1040 may be utilized to determine one or more factors as to drilling another well. Such factors can include factors that are "positive" and may include factors that are "negative". Positive factors can include what to include in the plan as to operations, equipment, etc.; whereas, negative factors can include what not do as to operations, equipment, etc. For example, a negative factor may be "do not include component XYZ in the bottom hole assembly for a well that is to be drilled within a radius of R from well ZZZ". In such an example, a factor or factors from an "offset" well that has at least in part been drilled can be utilized for generating a well plan and/or actual drilling of another well, which may be in the same basin or not.

The method 1000 is shown in FIG. 10 in association with various computer-readable medium (CRM) blocks 1011, 1021, 1031, and 1041. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1000. As an example, a computer-readable medium (CRM) may be a computer-readable storage medium that is non-transitory and not a carrier wave. As an example, one or more of the CRM block 1011, 1021, 1031 and 1041 can include instructions that can be instructions of a system such as, for example, the system 770 of FIG. 7 (see, e.g., the instructions 776). As an example, the method 1000 of FIG. 10 may be implemented at least in part by a system such as the system 770 of FIG. 7.

Figure 11:
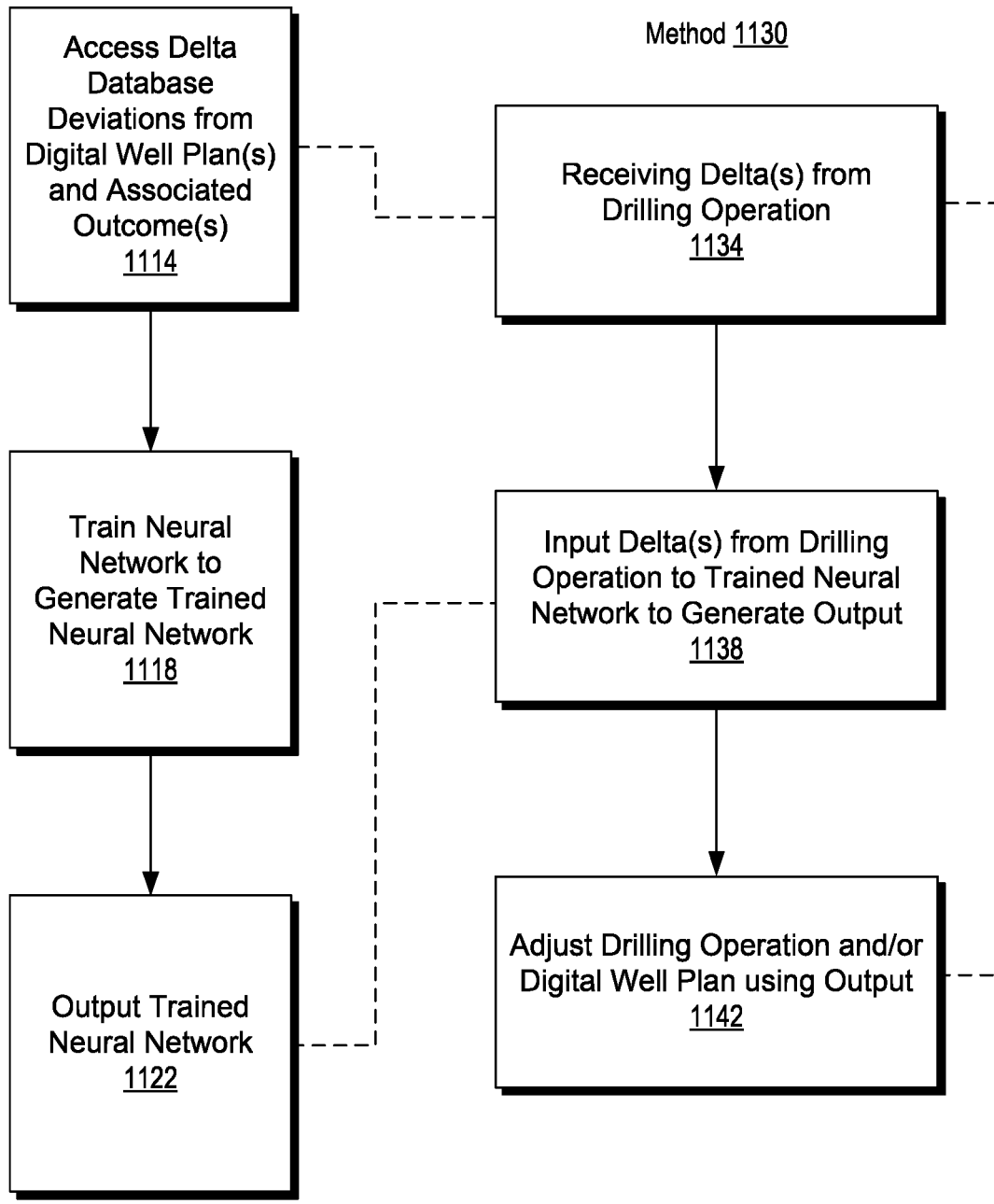
FIG. 11 illustrates an example of a method.

FIG. 11 shows an example of a method 1110 that pertains to training a neural network as an example of a training a machine model and a method 1130 that pertains to using a trained neural network as an example of using a trained machine model.

The method 1110 includes an access block 1114 for accessing a delta database from deviations from digital well plan(s) and associated outcome(s), a train block 1118 for training a neural network as a machine model to generate a trained neural network as a trained machine model, and an output block 1122 for outputting the trained neural network as the trained machine model.

The method 1130 includes a reception block 1134 for receiving delta(s) from a drilling operation, an input block 1138 for inputting the received delta(s) from the drilling operation to the trained neural network (the trained machine model) to generate output, and an adjustment block 1142 for adjusting the drilling operation and/or a digital well plan using the output.

In the example of FIG. 11, the deltas represent deviations from a corresponding digital well plan. Such deviations can be with respect to one or more of equipment, operation of equipment, timing of operations of equipment, etc. As an example, consider a digital well plan for a well that includes information to ramp up a pump rate of pumping drilling fluid where actual information from the rigsite indicates that the ramp up of the pump rate of pumping the drilling fluid deviated as to the ramp up profile. In such an example, consider a deviation as to duration for the ramp up and/or the final pump rate of pumping the drilling fluid. Such a deviation or deviations can be a delta or deltas. As an example, a trained neural network can be trained based on training data as to deltas such as deviations in ramp up with associated outcomes. In the foregoing example, the trained neural network can take the delta of the drilling operation as input and output a likely outcome. Where the outcome is a beneficial (e.g., positive) outcome, the drilling operation may continue with the deviation; however, where the outcome is a detrimental outcome (e.g., negative), the drilling operation can be adjusted such as by controlling one or more pieces of equipment and/or by adjusting the digital well plan for the well.

In the examples of FIG. 11, control can be effectuated based on actual deviations from digital well plans where such deviations may be positive, neutral or negative. As an example, a method may include accessing a database to identify one or more deltas that match a delta experienced during a drilling operation. Such a method may operate separately or in combination with the method 1110 and/or the method 1130.

As an example, a deviation from a digital well plan may pertain to location of a centralizer that acts to centralize a portion of a drill string in a bore. A centralizer can be a device fitted with a hinged collar and bowsprings to keep a portion of a drill string in the center of a bore. As to casing, if a casing string is cemented off-center, there can be a high risk that a channel of drilling fluid or contaminated cement will be left where the casing contacts the formation, creating an imperfect seal.

As an example, a digital well plan may call for locating a centralizer at a particular location (e.g., z-location such as $zc1$) along a drill string that is being utilized to drill a bore in a geologic formation according to a trajectory specified by the digital well plan. In such an example, where the z-location is not $zc1$ but rather $zc1$ plus a distance $zd$, then the delta can be a numeric value such as the distance $zd$ and/or the $zc1$ plus the distance $zd$, which may be referenced with respect to a component of the drill string such as a bit. The delta can be utilized to search a database of deltas and/or be utilized as input to a trained machine model such that a likely outcome can be determined for the delta. If the outcome is indicated as being detrimental, if the location cannot be adjusted, the outcome may be addressed via control of the drilling operation. Where the outcome is indicated as being beneficial, the benefit thereof may be addressed by optionally adjusting one or more actions of the digital well plan to take advantage of the benefit.

In various examples, a method may assume that a digital well plan is sufficient for a drilling operation. As such, where the drilling operation follows the plan, there may be no call for analysis. However, where a deviation occurs, a method can call for analysis to determine whether that deviation is likely to have an outcome that is beneficial, neutral or negative.

As an example, a digital well plan can include automated instructions for a piece of equipment. In such an example, during a drilling operation, information may be acquired at a rigsite that indicates that the piece of equipment operated in a manner that differed from the automated instructions. In such an example, as the instructions are automated instructions that are likely to have no to minimal impact from a human operator, the information acquired may indicate that the piece of equipment and/or a transmission channel to that piece of equipment may have an issue. In such an example, an analysis may indicate that a delta is associated with a potential equipment issue, rather than human action that caused a deviation from the digital well plan.

As an example, a delta can be a human action delta in that a human action is a direct cause of the delta. For example, where a digital drill plan calls for a mud pump flow rate of X to be set by a human operator and where the actual mud pump flow rate is set to Y, then the deviation is a human action delta.

As another example, consider a digital well plan that includes information as to how to mix mud (a recipe for drilling fluid) where a human operator deviates from the information in the digital well plan. In such an example, the human operator may proceed to follow how to pump the mud as set forth in the digital well plan or may adjust how to pump the mud based on experience. As to the latter, a delta generated by the lack of adherence to mud recipe may be flagged as a possible reason (or outcome) as to why the human operator deviated from the digital well plan on how to pump the mud. In such a scenario, a system can include generating output from input delta(s) and rendering one or more GUI notices to a display at a rigsite where the notices may indicate that (i) the how to mix mud was not followed and (ii) the how to pump the mud was not followed. In such an example, the human operator may interact with the GUI to confirm the notices, which may provide feedback that where a human operator deviates from how to mix mud, that human operator may deviate from how to pump the mud.

As explained, deltas can be equipment deltas or human deltas, or possibly a combination of equipment and human. Where deltas are human related, such deltas may be associated with a human operator or a team of operators. Such associations can be utilized, for example, as knowledge that a particular human operator and/or a team of operators may deviate from a digital well plan as to one or more aspects of that digital well plan. As such an operator or team may be experienced, they may be assumed to handle such deltas. However, where one or more other types of deltas arise for such an operator or team, those may be flagged as being of a heightened concern and analysis (e.g., "you do not normally deviate from that portion of the digital well plan, please consider X, Y and Z").

As to an equipment delta, that may be associated with one or more pieces of equipment. For example, a rig may be utilized to drill one or more wells using one or more common pieces of equipment. A piece of equipment that is flagged as generating a delta from a digital well plan may be subjected to repair, replacement, calibration, etc. As an example, where the piece of equipment is deemed adequate for use even though it throws a delta, the delta may be filtered out, particularly where the delta is associated with a neutral outcome. If an equipment delta is associated with a negative outcome, the piece of equipment may be subjected to intervention, such as being replaced or recalibrated, if possible.

As explained above, the use of deltas based on information in a digital well plan and actual information can improve drilling operations. Further, a delta-based approach can diminish the amount of information that demands analysis. For example, if a drilling operation deviates from a digital well plan in four instances, then four instances of analysis may be called for and corresponding results returned to a driller or drillers. Ultimately, a digital well plan that operates without a delta may be akin to a "no-hitter" or a "perfect game" in baseball in that everything went according to the digital well plan.

As deltas become understood better, digital well plans can be improved. As an example, deltas can give become a basis for operational bounds in a digital well plan (e.g., consider neutral outcomes). For example, where bounds are specified and actual parameter values fall within those bounds, delta generation may be decreased.

As a delta-based approach is utilized, evolution can be expected such that digital well plans improve and the number of deltas experienced per drilling operation diminishes. Over time, concepts such as the Pareto frontier and black swans can become more apparent, which, in turn, can be utilized to improve drilling operations.

Figure 12:
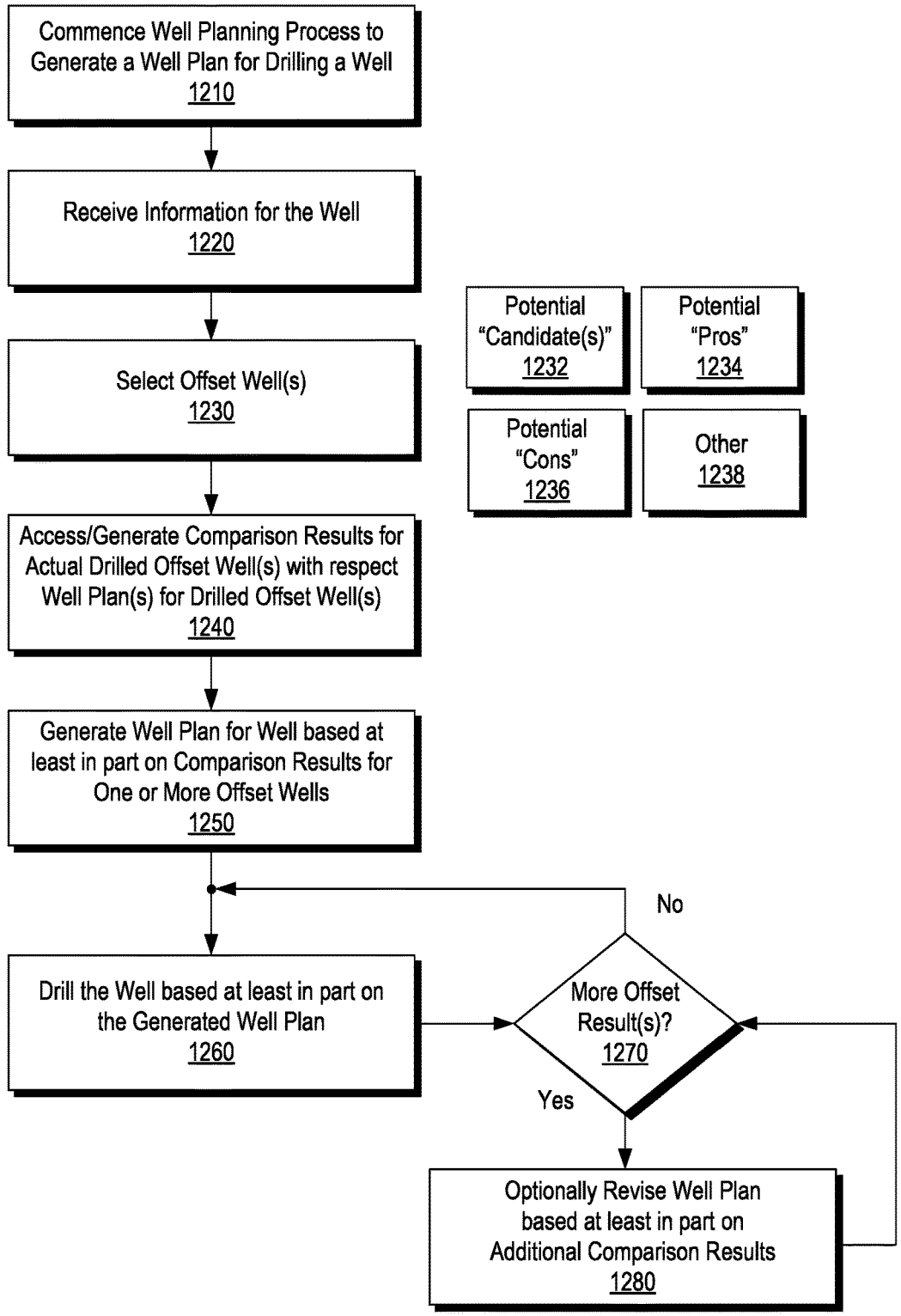
FIG. 12 illustrates an example of a method.

FIG. 12 shows an example of a method 1200 that includes a commencement block 1210 for commencing a well planning process to generate a well plan for drilling a well, a reception block 1220 for receiving information for the well, a selection block 1230 for selecting one or more offset wells (e.g., according to one or more factors such as a distance, a lateral length, a total depth, a type of BHA, etc.), an access and/or generate block 1240 for accessing and/or generating comparison results for one or more actual drilled offset wells with respect to one or more corresponding well plan(s) for one or more corresponding drilled offset wells, a generation block 1250 for generating a well plan for the well based at least in part on at least a portion of the comparison results for at least one of the one or more offset wells, and a drill block 1260 for drilling the well based at least in part on the generated well plan. As shown in the example of FIG. 12, the method 1200 can optionally include a decision block 1270 for deciding whether more offset results are available for one or more offset wells (e.g., an offset well of the block 1230 and/or another offset well) and a revision block 1280 for optionally revising the well plan based at least in part on additional comparison results. In such an example, the method 1200 may operate in real-time in a field wide manner as the field is being developed at least in part through drilling of wells.

As an example, comparison results may be revised based on post-drilling information such as, for example, production information of a well, fracturing information of a well, completion stability information of a well, etc. For example, where production is favorable, an analysis may be performed to identify one or more factors that gave rise to the favorable production, which can include drilling factors. Such factors may be indicated as being favorable, for example, via a machine learning model that is trained at least in part on post-drilling production data. In such an example, comparison results may be utilized when generating and/or revising a well plan for a well to achieve more favorable post-drilling production data from the well.

As to a completion, a method may assess trajectory tortuosity (e.g., angles, doglegs, etc.) and utilize a sensitivity analysis that links trajectory to one or more portions of a completion (e.g., casing, tubing, cementing etc.). In such an example, where an actual drilling operation results in a particular actual trajectory that differs from a well plan, an update may be made to a completion or a portion thereof. As an example, such an approach may be applied to one or more other types of operations (e.g., hydraulic fracturing, injecting, shutting-down, etc.).

As shown in the example of FIG. 12, the selection block 1230 may select one or more offset wells based at least in part on one or more of an offset well being a potential candidate 1232, as to one or more potential "pros" (e.g., favorable outcomes) 1234, as to one or more potential "cons" (e.g., exclusion based on an unfavorable outcomes such as non-productive time, etc.) 1236 and/or one or more other reasons, factors, etc. 1238.

Figure 13:
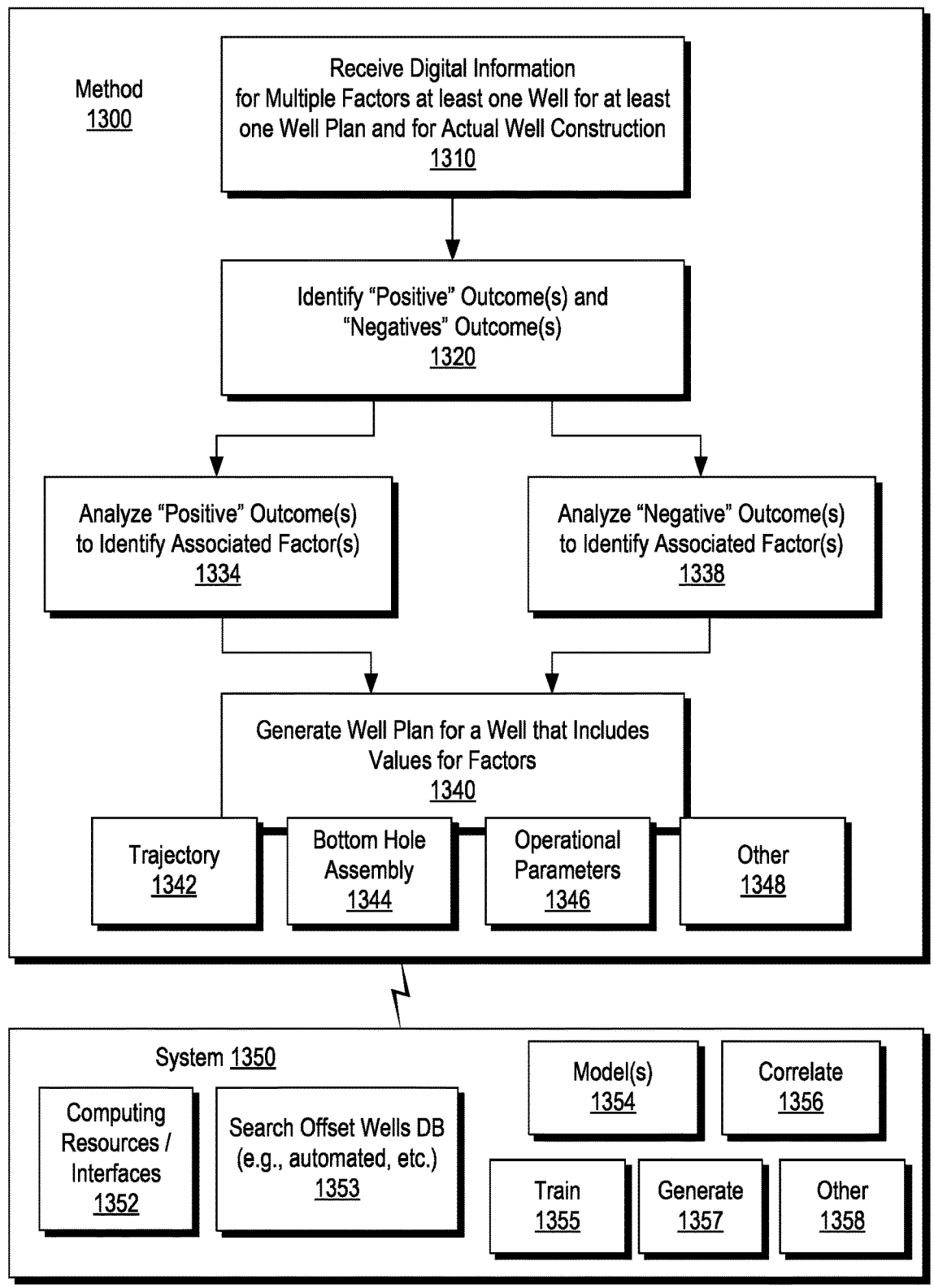
FIG. 13 illustrates an example of a method and an example of a system.

FIG. 13 shows an example of a method 1300 and an example of a system 1350. As shown the method 1300 can include a reception block 1310 for receiving digital information for multiple factors of at least one well for at least one corresponding well plan and for actual well construction (e.g., drilling, completion, etc.) for the at least one well, an identification block 1320 for identifying "positive" outcomes and "negative" outcomes based at least in part on the received digital information (e.g., optionally via determination of differences, etc.), an analysis block 1334 for analyzing the "positive" outcomes to identify associated factors (e.g., via one or more techniques, which may include one or more models and/or one or more correlation techniques), an analysis block 1338 for analyzing the "negative" outcomes to identify associated factors (e.g., via one or more techniques, which may include one or more models and/or one or more correlation techniques), and a generation block 1340 for generating a well plan for a well that includes values for a plurality of factors where the values include values that are based at least in part on the analyses of the analysis blocks 1334 and 1338.

In the example of FIG. 13, the reception block 1310 may receive digital information for a plurality of wells and for actual well construction (e.g., drilling, etc.) for at least a portion of the plurality of wells. As an example, the positive and/or negative outcomes of the block 1320 may be identified and stored to a database and/or the associated factors of the blocks 1334 and 1338 may be identified and stored to a database. As an example, information received per the reception block 1310 and information of the blocks 1320, 1334 and/or 1338 may be utilized for purposes of training and/or further training one or more models. As an example, a trained model may be a trained neural network model that can receive one or more inputs and that can generate one or more outputs. As an example, in FIG. 13, the generation block 1340 may generate the well plan utilizing one or more trained models where the generated well plan includes values for various factors (e.g., trajectory, equipment, operations, etc.) that aim to increase probability of positive outcomes and/or to decrease probability of negative outcomes.

In the example of FIG. 13, the generation block 1340 can include generating a well plan that can reduce risks and that can increase benefits. For example, a reduction of risk can be via the analysis of the analysis block 1338 (e.g., directly and/or indirectly) while an increase of a benefit can be via the analysis of the analysis block 1334 (e.g., directly and/or indirectly). As an example, a reduction of risk may be a reduction of a risk of sticking (e.g., a drillstring getting stuck) while an increase of a benefit may be a decrease in a time to perform an operation (e.g., an increase in rate of penetration in a particular portion of a well trajectory to be drilled).

As an example, the method 1300 may include identifying productive time and/or non-productive time as various types of outcomes and analyzing those one or more types of outcomes to identify one or more associated factors. As an example, the generation block 1340 can include generating a well plan that includes values (e.g., determined by a computing system such as the system 1350) that aim to decrease non-productive time and/or increase productive time (e.g., over a span of time for performance of one or more operations for drilling a well, etc.).

In the example of FIG. 13, the generated well plan of the generation block 1340 can include information as to trajectory 1342, bottom hole assembly 1344, operational parameters 1346 and one or more other factors 1348. Such information may be in digital form and stored as a file and/or streamed via one or more networks, cables, antennas, etc. As an example, information may be directed to one or more destinations for one or more purposes. For example, a trajectory team may receive information as to trajectory 1342 while an equipment team may receive information as to the bottom hole assembly 1344 while an operations team may receive information as to operational parameters 1346. In such an example, some information may be sent to multiple teams with different missions.

As an example, outputs from the analysis blocks 1334 and 1338 may be via a computing system (see, e.g., the system 1350) that includes one or more network interfaces that receive information as associated with various wells. As an example, such a computing system may be a well planning system that operates in real-time or near-real-time such that a well to be planned can be planned using the latest available information as to a plurality of wells that have been drilled and/or that are being drilled.

As an example, the method 1300 of FIG. 13 can implement one or more machine learning models as to a well, which can include models of drilling and/or production; noting that, as mentioned, post-drilling production information may be available (e.g., and/or other post-drilling information). As an example, a model can include nodes associated with factors where deviation between a plan and an actual can be utilized as a basis for identifying "positive" outcomes (e.g., beneficial outcomes) and for identifying "negative" outcomes (e.g., detrimental outcomes). In such an example, time may be used as a basis for such identifications. For example, where productive time is decreased, that may indicate a beneficial outcome; whereas, where productive time is increased and/or where non-productive time exists, those may indicate a detrimental outcome. While an outcome may be identified based at least in part on a comparison of planned information and actual information (e.g., as to one or more factors, and optionally time), one or more underlying reasons as to the outcome may be associated with a particular factor that is not a direct basis for a differential between planned information and actual information. For example, if rate of penetration decreased below the planned rate of penetration over a portion of a trajectory, that difference may be identified as a detrimental outcome (e.g., as a numeric difference, etc.); however, the underlying reason may yet to be determined. In such an example, a model can assess the decrease in rate of penetration and relate it to a factor or factors of a well plan such as, for example, one or more of a trajectory factor, a BHA factor, an operational factor, etc. Such a model may be a machine learning model (e.g., neural network, etc.) that associates factors of a well plan with one or more identified outcomes, which can be, for example, positive and/or negative. In the aforementioned example, consider a combination of factors such as drilling fluid and top drive factors as contributing to the decrease in rate of penetration. Where such factors are identified (e.g., and associated values), the method 1300 may generate the well plan with values that aim to reduce the risk of experiencing a decrease in a rate of penetration within that portion of a trajectory (e.g., as may be associated with a particular curve angle, a particular formation, etc.).

As an example, a machine learning model may be utilized for identifying outcomes, identifying factors and, for example, generating a well plan based on input information for a well to be drilled according to the well plan (e.g., preliminary specification of location, preliminary specification of equipment, etc.). As an example, preliminary specification of equipment can include preliminary specifications of one or more BHA components (e.g., drill bit, stabilizers, logging-while-drilling, etc.). As an example, a generated well plan may output different and/or additional specifications for such equipment.

In the example of FIG. 13, the generated well plan may be output by the block 1340 with information as to how much time may be saved by drilling the well according to the generated well plan. In such an example, times may be plotted versus length for the generated well plan. As an example, a graphical user interface may render information to a display that includes information for offset wells (e.g., as associated with the reception block 1310, etc.) and information for the generated well plan. In such an example, an operator may, a priori, understand where and how a well plan is improved upon, similar too, etc., one or more other well plans and/or actual drilled wells.

As an example, the method 1300 can be utilized in a manner that chains well information as wells are being planned and drilled. For example, where ten wells have been drilled, the generated well plan of the generation block 1340 may be for an eleventh well. As an example, the method 1300 may be implemented for wells that are actively being drilled. For example, an offset well may be a well that is several days ahead in being drilled compared to a well for which a well plan is generated. In such an example, the several days of information can be received and analyzed for differences as to that well between planned and actual drilling where such differences are assessed and further analyzed for generation of the well plan for the well that is to be drilled or that is actually being drilled, but at a stage that is behind in time and/or depth (e.g., length, etc.).

As an example, the method 1300 of FIG. 13 may include computing residuals for factors of a well plan with respect to actual factors from drilling at least a portion of the well based at least in part on the well plan.

As an example, the method 1300 of FIG. 13 may include outputting lessons learned through a comparison of well plans to actual drilling information. As an example, the method 1300 of FIG. 13 can include identifying and outputting factors that may be consistently having large differentials between planned and drilled. For example, where a rate of penetration (e.g., as an operational parameter) as planned through a particular formation (e.g., lithology) is consistently large in one direction (e.g., negative or positive), that factor may be flagged for assessment, which may include "offline" human assessment. As an example, where a portion of a trajectory through a particular formation (e.g., lithology) is consistently being altered as to angle by a driller that may have drilled a plurality of wells through that formation, that portion of the trajectory (e.g., as a trajectory factor) may be flagged for assessment.

As an example, the method 1300 of FIG. 13 may include ranking of the identified outcomes where various outcomes may be considered and other not considered. For example, if a negative outcome ranks number six of ten, the method 1300 may skip negative outcomes six to ten to focus on negative outcomes one to five. As an example, where a negative outcome is a "reality" in that a well plan was inaccurate as to being overly optimistic, etc., that negative outcome may optionally be ignored. For example, a computing system may allow for a user to select one or more identified outcomes for purposes of generating a well plan. In such an example, the computing system may render information to a display in the form of a graphical user interface where a user can review positive and negative outcomes and select from those outcomes which ones are to be utilized in generating a well plan per the block 1340.

As an example, a well plan can be or include a series of cascading decisions. As an example, a well plan may be implemented at least in part as a series of cascading decisions. In such an example, a preliminary decision may pertain to instrumentation of a drillstring, a rig, etc. for acquisition of information germane to planning (e.g., a computing system that can implement a machine learning planning technique or techniques, etc.).

As to the example system 1350, as shown in FIG. 13, it can include computing resources and one or more associated interfaces 1352 (e.g., for transmission and/or reception of information), a search engine 1353 that can search for one or more offset wells for which information may be stored in a database, one or more models 1354, one or more training algorithms 1355 that can train a machine model (e.g., neural network, etc.) to generate a trained machine model, one or more correlation algorithms 1356, one or more generation algorithms 1357 and one or more other features 1358.

In the example of FIG. 13, the search engine 1353 may operate in an automated mode, a semi-automated mode and/or a manual mode. As an example, one or more search criteria may be received by the search engine 1353 in one or more manners (e.g., via parsing of received information for a well, via one or more fields of a GUI, etc.). As an example, a proximity criterion may be a radius from a well for which a well plan is to be generated per the block 1357. In such an example, offset wells that are within the radius may be selected. As an example, training of a model or models may occur based on information for a plurality of wells. In such an example, as wells are completed (e.g., drilled, cased, producing, etc.), information for such wells may be utilized for further training. As to correlation, as mentioned, one or more correlation techniques may be implemented to associate factors such that an outcome, which may be a factor (e.g., a primary factor, etc.) can be associated with one or more other factors. In such an example, values for one or more factors may be utilized for purposes of well plan generation, well plan revision, control of one or more field operations, etc.

As shown in FIG. 13, as an example, the system 1350 may be utilized to implement at least a portion of the method 1300. For example, an interface of the system 1350 can provide for receiving digital information per the reception block 1310, computing resources of the system 1350 can provide for determining differences between factors of well plans, computing resources of the system 1350 can provide for identifying various factors (e.g., primary, secondary, tertiary, etc.) based on one or more differences (e.g., and optionally magnitude of such differences, occurrence of such differences with respect to time, with respect to distance, etc.), and computing resources of the system 1350 can provide for training one or more models (e.g., one or more neural network models, etc.) to generate one or more trained models. In such an example, input information may be received for a well to be planned where such information may be directly input and/or pre-processed for input to a trained model or trained models for purposes of generating output that can be utilized for generating a digital well plan.

As mentioned, as an example, a trained model may be utilized during an operation such as a drilling operation performed by a rig at a rigsite as specified by a digital well plan to receive information as to a deviation from the digital well plan to output an outcome based on the deviation. As an example, consider deviation information pertaining to dogleg severity (DLS) of a borehole being drilled by the drilling operation where the deviation information is received by a trained neural network model that outputs a likely outcome or a plurality of possible outcomes with associated likelihoods of occurrence. In such an example, a notification can be issued to equipment at a rigsite that can address one or more of the outcomes. For example, a notification may pertain to one or more operations (e.g., drilling, casing, cementing, etc.) that may act to reduce the risk of an outcome and/or to reduce the impact of an outcome.

As to a dogleg, it can be defined as a particularly crooked or curved place in a bore where the trajectory of the bore in three-dimensional space changes relatively rapidly. While a dogleg can be created intentionally as part of a digital well plan, for example, to be performed by directional drilling, a dogleg may refer to a section of a borehole that changes direction faster than expected or desired, which may be accompanied by detrimental effects that may manifest short-term, medium-term and/or long-term. As to some examples, short-term may impact an ongoing drilling operation, medium-term may impact a completions operation, and long-term may impact production from the borehole as a completed well. As an example, an outcome may be associated with a time-frame or time-frames as to which the outcome may be expected.

In surveying wellbore trajectories, a standard calculation of dogleg severity may be made, for example, expressed in two-dimensional degrees per 30 meters (e.g., or 100 feet) of borehole length. As an example, where a dogleg in a section of a digital well plan deviates from one or more specifications of the digital well plan, it is possible that a planned casing string may no longer easily fit through that section. As an example, where a dogleg in a section of a digital well plan deviates from one or more specifications of the digital well plan, there may be repeated abrasion by the drillstring in a particular location of the dogleg, which may result in a worn spot called a keyseat, in which the bottom hole assembly components may become stuck as they are pulled through the section. As an example, where a dogleg in a section of a digital well plan deviates from one or more specifications of the digital well plan, casing cemented through the dogleg may wear at a rate that is quicker than planned due to higher contact forces between the drillstring and the inner diameter (ID) of the casing through the dogleg. As an example, where a dogleg in a section of a digital well plan deviates from one or more specifications of the digital well plan, a relatively stiff bottom hole assembly may not readily fit through the dogleg section as may have been drilled with a relatively limber bottom hole assembly. As an example, where a dogleg in a section of a digital well plan deviates from one or more specifications of the digital well plan, an excessive dogleg increase may increase overall friction to a drillstring, increasing the likelihood of getting stuck or not reaching the planned target and/or total depth. As an example, a recommendation may accompany an outcome notification, which may include one or more actions that can be taken to address short, medium and/or long term effects. As an example, a recommendation may include taking remedial action, such as, for example, reaming or underreaming through the dogleg, or even sidetracking in extreme situations.

As an example, an ANN can be trained as to deviations from digital well plans (e.g., deltas between planned and actual) as to doglegs with respect to outcomes for a plurality of drilled boreholes that can include boreholes that have been completed as wells and can include wells that have been utilized for producing fluid from one or more reservoirs. As an example, a trained ANN can be utilized to output outcomes given a deviation as to a dogleg from a dogleg of a digital well plan during a drilling operation.

As an example, a modeling system can learn (e.g., progressively improve performance) to do tasks by considering examples, which may occur optionally without task-specific programming. As an example, a training set for a modeling system that includes one or more models to be trained can include information for a plurality of wells where each of the wells may have been drilled at least in part according to a plan. As an example, a training set may prepared by analyzing data for purposes of determining differences for a variety of factors and/or associating a variety of factors.

As an example, an ANN can be based on a collection of connected units called artificial neurons where a connection between neurons can transmit a signal to another neuron (or neurons). As an example, a receiving neuron can process the signal(s) and then, for example, signal downstream neurons connected thereto. As an example, an ANN may include layers where an input layer (e.g., for deltas) and an output layer (e.g., for outcomes) are exposed while other layers may be hidden. As an example, neurons of an ANN may have state, generally represented by real numbers, which may be, for example, between 0 and 1, −1 and 0, −1 and +1, etc. As an example, neurons and synapses may also have a weight that varies as learning proceeds, which can increase or decrease the strength of a signal that it may send downstream. As an example, a threshold or thresholds may be utilized such that if an aggregate signal is below (or above) that level, a downstream signal is sent.

As mentioned, neurons can be organized in layers where, for example, different layers may perform different kinds of transformations on their inputs. As an example, signals can travel from the first (input), to the last (output) layer, possibly after traversing one or more layers one or more times. As mentioned, as an example, input(s) can be information about a well to be drilled and output(s) can be one or more factors that can be directly and/or indirectly specified in a digital well plan for drilling the well. As mentioned, input(s) can be information about a well being drilled and output(s) can be outcome(s) based on deviation(s) in one or more factors that can be directly and/or indirectly specified in a digital well plan for drilling the well.

Figure 14:
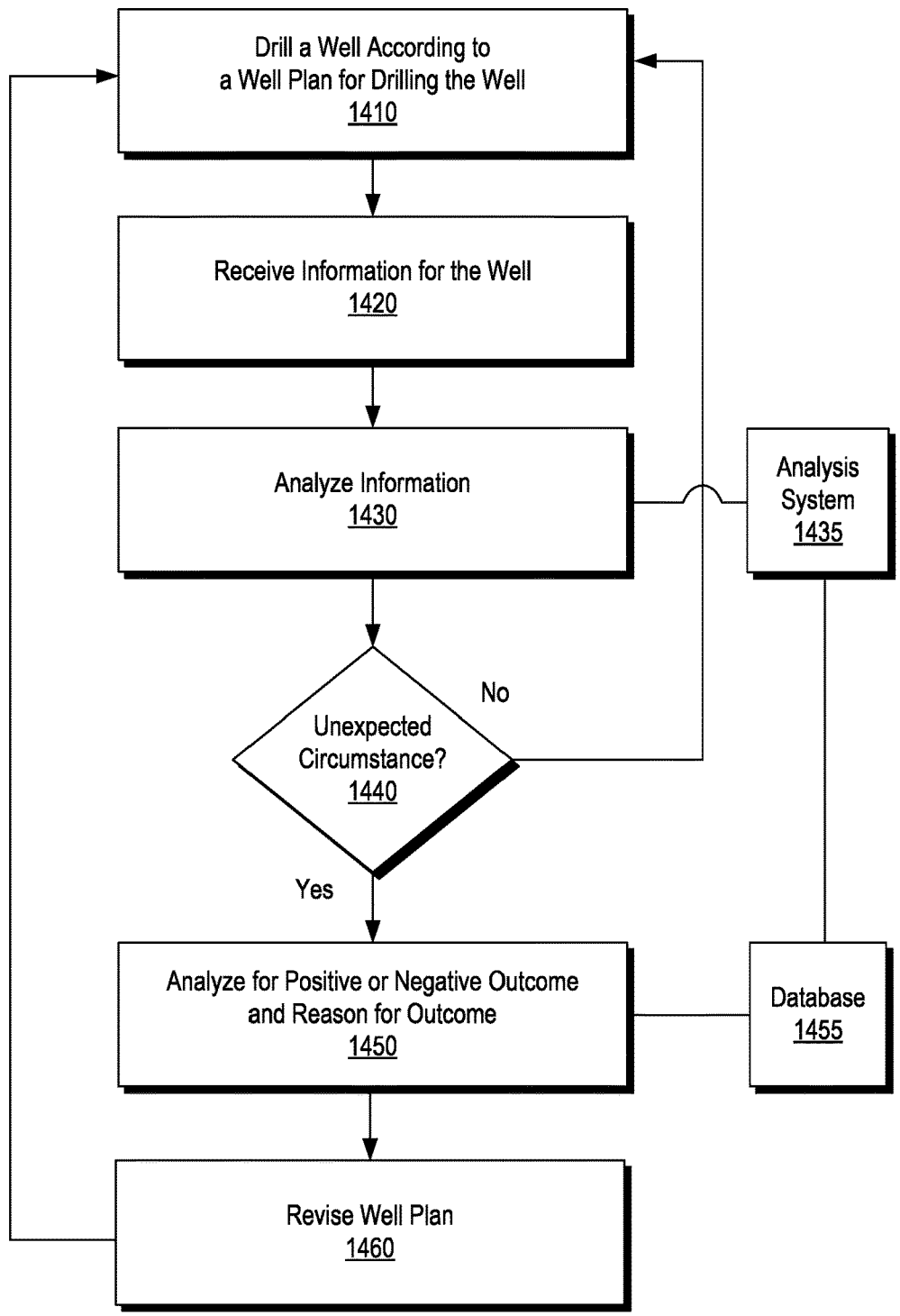
FIG. 14 illustrates an example of a method, an example system and an example database.

FIG. 14 shows an example of a method 1400 that includes a drill block 1410 for drilling a well according to a well plan for drilling the well (e.g., a digital well plan), a reception block 1420 for receiving information for the well (e.g., during the drilling of the well), an analysis block 1430 for analyzing at least a portion of the received information with respect to at least a portion of the information of the well plan, a decision block 1440 for deciding whether an unexpected circumstance exists based at least in part on the analyzing, an analysis block 1450 for analyzing the unexpected circumstance as to being a positive outcome or a negative outcome (e.g., or a neutral outcome) and an optional revision block 1460 for optionally revising the well plan based at least in part on the analyzing of the unexpected circumstance. The method 1400 can include storing information generated via the one or more analyzes of blocks 1430 and 1450, which may be utilized for purposes of well planning. For example, consider an analysis system block 1435 and a database block 1455, which may be operatively coupled and include accessible data associated with outcomes and/or one or more machine models that are trained and/or that can be trained and used for determining an outcome or outcomes based at least in part on information for a well (e.g., well plan information and actual information from drilling of the well). As an example, the method 1400 can include storing information received per the reception block 1420 and/or storing information as to one or more unexpected circumstances per the decision block 1440. Various types of information may be stored as part of the method 1400, which may be utilized, for example, to plan, revise a plan, control an operation, etc.

As to the revision block 1460, where an outcome does not reasonable inform a future operation as to drilling of the well, the analyzing of the block 1450 may, for example, ignore, store, etc. the reason or reasons for the outcome.

As an example, the method 1400 of FIG. 14 can include issuing one or more signals, instructions, commands, etc., based at least in part on an analysis and/or a decision (e.g., the block 1430, the block 1440, the block 1450, etc.). In such an example, such a signal, instruction, command, etc. may be transmitted via an interface of a computing system (e.g., via a network interface) and, for example, may be received by one or more pieces of equipment (e.g., a control interface of a controller, an actuator, etc.).

As an example, a method can include instrumenting a system such that information may be acquired. As an example, a method can include deciding that drilling faster or drilling slower than expected can be unexpected circumstances. In such an example, the system (e.g., drilling system) may be instrumented with sufficient sensors, etc. to be able to acquire information that may be analyzed to determine one or more underlying reasons as to why drilling is at an unexpected rate (e.g., whether faster or slower). As an example, information may be length versus time information such that a rate of penetration can be determined. As an example, information as to drilling speed (e.g., rotational speed), drilling fluid flow rate(s), drilling fluid density, etc., may be acquired via instrumentation that may allow for an analysis to determine which one or more of such factors may have attributed to an unexpected rate of penetration. In such an example, a model may be utilized, which may be a machine learning model of drilling.

As an example, the method 1400 of FIG. 14 can include capturing state information as to a state of a drilling rig, as to state of a drillstring, as to state of a formation at a time associated with an unexpected circumstance. As an example, states may be captured for times prior to occurrence of the unexpected circumstance, which may be analyzed as to one or more underlying reasons therefor. As an example, a model may be a state-based model that can be implemented in a method that includes receiving state information for a time or a plurality of times and analyzing the state information for an underlying cause of an unexpected circumstance or unexpected circumstances. As an example, the method 1400 of FIG. 14 can include a counter that counts a number of times a particular type of unexpected circumstance has occurred. As an example, the method 1400 of FIG. 14 may identify in the well plan one or more times, depths, lengths, etc. where an unexpected circumstance may again occur, for example, if a particular revision to the well plan is not made.

As explained with respect to the method 1400 of FIG. 14, unexpected circumstances can be determined based on one or more difference between a well plan's actions (e.g., decisions in a series, etc.) and actual actions (e.g., decision in a series, etc.). Such a method may, in real-time, provide for an assessment of a current well plan and optionally revision of the well along with, for example, output of what might happen if one or more revisions are made to the well plan and/or if one or more revisions are not made to the well plan.

As an example, a positive outcome of a drilling operation may be achieving a rate of penetration (ROP) that is greater than expected per a well plan. In such an example, where information associated with a BHA is a factor or factors along with weight on bit (WOB), such a factor or factors may be identified via analysis as underlying causes of achieving the unexpected ROP. In such an example, the ROP may pertain to a particular formation, a particular depth, etc., such that one or more lessons learned (e.g., by a machine learning system) may be applied to one or more other wells to be planned that include drilling into that formation at that particular depth, etc. Where a favorable outcome is desired, the learning of the offset well (as discussed above) may be utilized. In the foregoing example, where an analysis indicates that BHA is a causal factor but not WOB, as to the favorable ROP, such a learning may be utilized and associated with one or more pieces of the BHA and/or operation thereof. Further, where BHA is not a causal factor but WOB is a causal factor, then WOB may be associated with a formation, a rig system, etc.

As an example, the method 1400 of FIG. 14 can be a dynamic method that may be implemented in multiple instances for a plurality of wells that are being drilled. In such an example, the multiple instances may be linked, for example, via a computing system, which may be, for example, at least in part a cloud-based computing system. In such an example, an Internet-of-Things (IoT) approach may be made to instrumentation in a secure manner for one or more rigsites in a field or fields.

As an example, a method can include outputting a heat map as to various factors and/or outcomes as to one or more drilling operations, whether ongoing, past or planned.

As an example, a method can include capturing information when a deviation has occurred or may occur. As an example, a heat map may extend to future times for a well plan, which may indicate where one or more deviations may occur from a well plan. Such a heat map may indicate sensitivities of a well plan to actual or possible deviations. As an example, a heat map can include positive indications and/or negative indications. In such an example, a heat map or heat maps may be factor specific in a manner where a red color (e.g., high heat) indicates that a factor is more likely to deviate in a detrimental manner from its planned factor value and where a blue color (e.g., low heat) indicates that a factor is more likely to deviate in a beneficial manner form its planned factor value. As to factors that are less likely to deviate, these may be rendered to a display in a heat map with a neutral color (e.g., white, gray, etc.). In such an example, a heat map may be a factor map with respect to time, with respect to depth, with respect to length, or with respect to one or more other variables.

Figure 17:
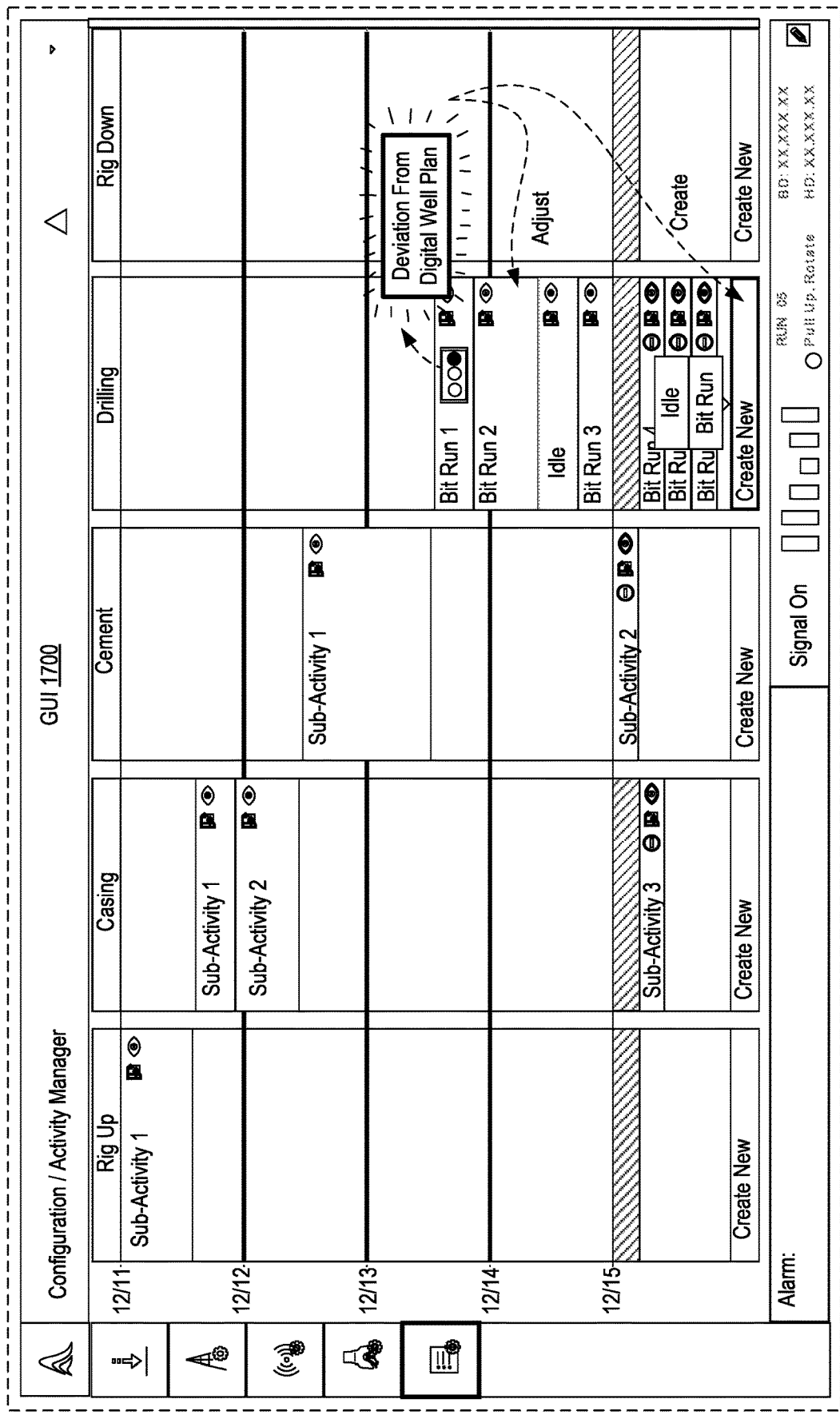
FIG. 17 illustrates an example of a GUI and examples of notification graphical controls.

As an example, a GUI such as the GUI 1700 of FIG. 17 may be color-coded with respect to outcomes output by a computational framework that can receive input such as deltas between planned and actual actions. For example, various activities and/or sub-activities may be color-coded based at least in part on one or more outcomes output by such a computational framework (see, e.g., the system 1350 of FIG. 13, the analysis system 1435 and the database 1455 of FIG. 14, etc.).

As an example, consider a drill bit with an expected ROP where downhole factors can be ascertained. In such an example, a method can include ascertaining whether the expected ROP can be achieved for one or more portions of a trajectory of a well to be drilled. Such a method may be dynamic and be updated during drilling of the well where the method can identify positive outcomes and identify negative outcomes based at least in part on data acquired during drilling.

As an example, a method can include accessing a database that includes information for more than approximately 100 wells, more than approximately 500 wells, more than approximately 1000 wells, etc. In such an example, for a single well, a portion of the other wells can be offset wells, which may be selected based on one or more selection criteria (e.g., location, type of equipment, etc.). As an example, a factor may be represented as a dimension of a well plan. For example, a model that can represent a drilling process can include dimensions where at least some of the dimensions represent factors.

As an example, a drilling operations system can receive and implement a digital well plan where the digital well plan is relied upon to determine a series of cascading decisions where each of the decisions can be a "test case" where a difference may exist between the digital well plan and actual implementation thereof (e.g., via execution of a decision by the drilling operations system). As mentioned, a difference may be positive or negative with respect to it being beneficial or detrimental.

As an example, a well plan as executed can be discretized into time and/or distance based increments that can be individually classified as being positive, neutral or negative. As an example, a graphical user interface may allow for rendering a visualization to a display as to positive outcomes, negative outcomes, etc., with respect to one or more variables (e.g., time, depth, length, etc.).

As an example, increments may optionally be determined based on type of activity and/or type of equipment (e.g., data acquisition capabilities). As an example, a method may be implemented in a manner that can dynamically request a change (e.g., an adjustment, etc.) in a data acquisition rate. For example, where a positive and/or a negative outcome may be uncovered and/or predicted, the method 1400 of FIG. 14 may include issuing an instruction (e.g., a signal, a command, etc.) that causes equipment in the field to increase and/or decrease a data acquisition rate. In such an example, the increased acquisition rate (e.g., increased frequency of data acquisition) may provide for a more detailed analysis as to one or more underlying causes of an outcome.

As an example, a digital well plan can include a data acquisition schedule for one or more pieces of data acquisition equipment (e.g., one or more sensors, etc.). Such a schedule or schedules may be a factor or factors that are part of the digital well plan that may be amenable to revision, etc. As an example, a machine learning model may optionally include features for modeling data sufficiency where if data sufficiency can be linked to a data acquisition rate. In such an example, the machine learning model may output information for one or more data acquisition rates of one or more pieces of equipment, which may depend on one or more factors (e.g., activity, depth, length, time, etc.). As an example, a data acquisition rate may be set in a digital well plan in a logical manner. For example, if the drilling fluid flow rate exceeds X, then increase the data acquisition rate of sensor Y to a rate that is greater than Z.

As an example, consider vibration data as an example of a type of data. In such an example, a digital well plan may specify logic that can be implemented to control the acquisition rate of vibration data by one or more vibration sensors. In such an example, where vibration increases above a threshold, the acquisition rate may increase for acquisition of vibration data. As an example, a method may include predicting a certain interaction for a BHA during drilling (e.g., based on BHA type, operational parameters, depth, length, formation, mud flow rate, mud density, etc.). In such an example, the method may aim to make recommendations and/or revisions responsive to actual interaction where vibration data may be helpful for purposes of understanding the interaction, controlling the drilling process, revising a well plan, etc. In such an example, the method may implement a more advanced vibrational analysis technique (e.g., as to spectral distribution, trend of vibration, etc.).

As an example, where during drilling, pressure in a drilling fluid system is fluctuating (e.g., per acquisition of pressure data at a first acquisition rate), a digital well plan may include logic that can be implemented by a drilling system to increase acquisition rate of one or more types of data such as, for example, RPM, WOB and pressure (e.g., to a higher second rate). Such an approach to determine a correlation between the fluctuating and one or more factors. As an example, a correlation may be model based where, for example, a model may account for one or more aspects of a drilling operation (e.g., backpressure may be determined in part by an amount clearance around a drill bit of a BHA as to its fluid nozzles with respect to a formation, etc.). As an example, information about a BHA may indicate that it includes a drill bit and a reamer, where such factors can be related to pressure fluctuations. In such an example, logic of a well plan may call for increased acquisition of annulus pressure and/or standpipe pressure, to help assess and/or control the scenario (e.g., fluctuations of pressure, etc.). Such information may lead to one or more lessons learned, which may inform further drilling of the well and/or drilling of one or more other wells.

As an example, logic of a well plan can include data acquisition logic as to primary parameters (e.g., primary factors) and other factors (e.g., secondary and/or tertiary factors). In such an example, the factors may be associated via a model, which may be a machine learning model. As an example, a model may be implemented in real-time during a drilling operation where a revision to a well plan may be made that includes revision one or more logics associated with data acquisition. In such an example, the model as part of a computing system can determine what types of data and/or data acquisition rate(s) that can help to inform the model for purposes of a well currently being drilled and/or for planning of one or more other wells (e.g., not yet drilled and/or partially drilled).

As an example, consider an expected rate of penetration of approximately 15 meters per hour and an actual rate of penetration of approximately 25 meters per hour. Such an occurrence can be classified as a positive outcome. A drilling system that includes or is operatively coupled to a well planning system, may analyze the ROP as a primary variable in conjunction with one or more other variables, which may be at least in part a cause of the positive outcome. In such an example, the system or systems may optionally operate in real time. Such a system or systems provide for cross-coupling of factors.

As an example, a digital well plan can be a revisable well plan, which may include logic as to data acquisition that may optionally be revisable. As an example, a digital well plan may be received at least in part by a drilling system for purposes of execution of at least a portion thereof, which may be executed as a series of decisions that are made as to equipment at a rigsite.

As an example, a portion of a digital well plan may be renderable in a hard copy version, for example, in paper as may be utilized by an operator or operators at a rigsite (e.g., in a doghouse, etc.).

As an example, a portion of a digital well plan may be pushed to one or more sub-systems. For example, consider a portion of a digital well plan that includes one or more settings for one or more pieces of equipment of a subsystem. In such an example, a subsystem may pertain to drilling fluid, data acquisition, weight on bit, a top drive, latching, etc.

As an example, a plan may include information as to one or more completions. As an example, a plan may include information as to one or more stages of hydraulic fracturing. As an example, a plan may include information as to one or more types of treatments.

As an example, a plan may include information as to one or more tests. For example, consider information as to pressure testing a tubing, pressure testing a packer in an annulus, etc.

As an example, a computing system that provides for well planning can include a simulator that can simulate time, simulate depth, simulate length, etc. Such a computing system may simulate multiple variables and associated such variables with particular operations (e.g., decisions, etc.).

As an example, a computing system that provides for drilling operations, etc., can include one or more times, clocks, etc. that can record time as associated with one or more operations, one or more conditions, etc. As an example, a computing system that provides for drilling operations can include input(s) for sensor(s) or other information as to depth and/or length of a borehole in a formation and/or optionally as to particular equipment, fluid, etc. in the borehole. As an example, information compared as to a well plan and actual drilling may extend beyond time. As an example, an analysis may include time and depth and/or length to determine an outcome or outcomes and/or underlying cause or causes thereof. As an example, an activity time for a particular operation may be associated with a start time and a finish time as well as one or more depths and/or lengths. In such an example, cross-correlating with one or more factors may occur with respect to one or more of time and/or depth and/or length. In such an example, time may allow for one type of cross-correlation while depth and/or length may allow for another type of cross-correlation. Such cross-correlation(s) may be for a primary factor with respect to one or more other factors where, for example, the primary factor may be classified as being indicative of a positive/ beneficial outcome or a negative/detrimental outcome.

As an example, one or more of the methods of FIGS. 10, 11, 12, 13 and 14 may be implemented at least in part by one or more of the systems of FIGS. 2, 3, 4, 5, 6, 7, 8, 9, 13 and 14.

Various tools may be implemented to perform a method or methods, which may be in the form of a workflow or workflows. For example, a tool can be a graphical user interface (GUI) that is rendered to a display where a human input device (HID) can generate signals, instructions, etc., responsive to human input. An HID may be operatively coupled to one or more devices and/or systems. As an example, an HID may be a touchscreen, a mouse, a trackpad, a roller, a stylus, a virtual reality (VR) system, etc.

Figure 15:
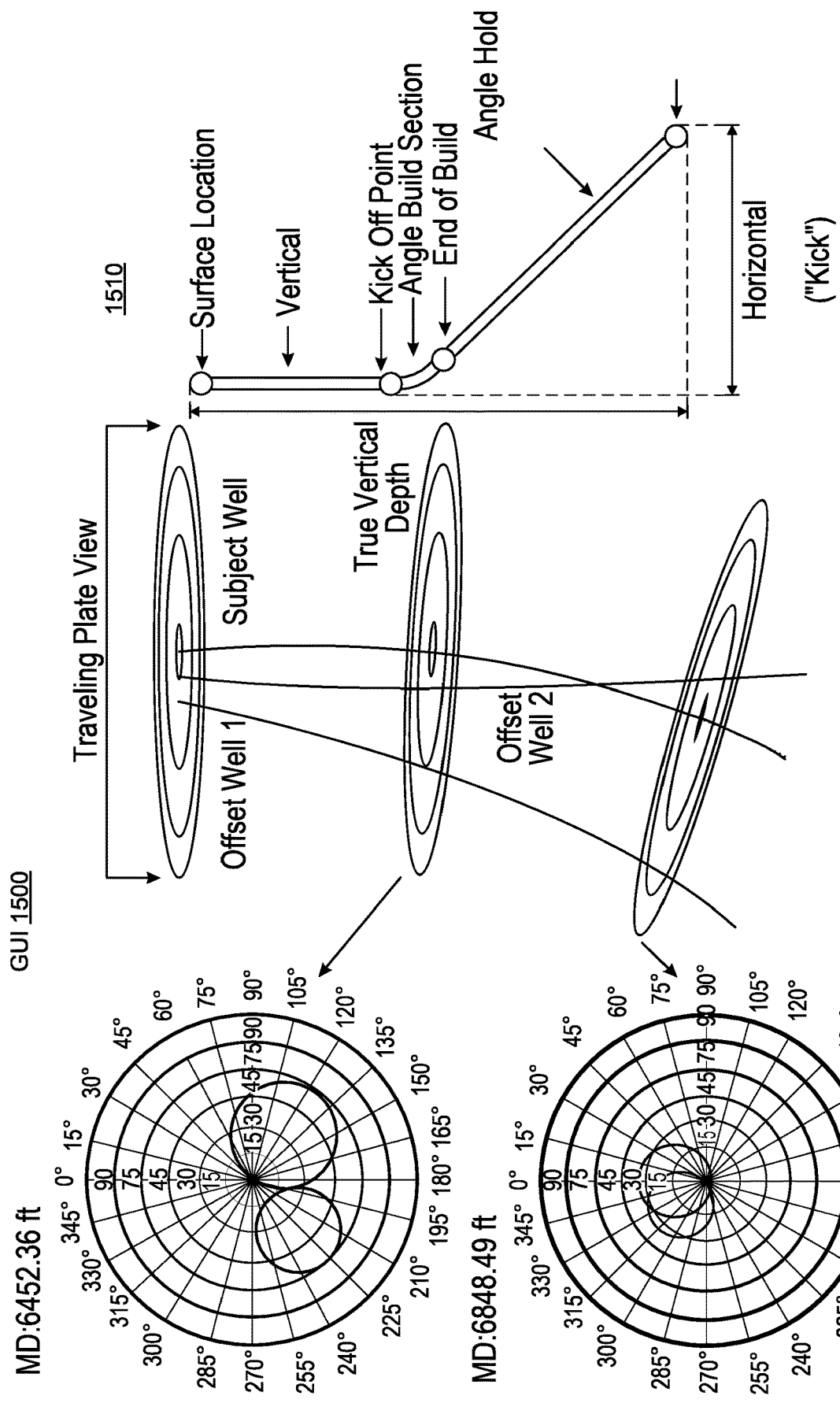
FIG. 15 illustrates examples of GUIs.

FIG. 15 shows an example of a graphical user interface (GUI) 1500 that may be rendered to a display as well as a graphic 1510 that illustrates various terms that may be utilized to describe a trajectory, a borehole, a well, a wellbore, etc. As an example, one or more factors of a trajectory may correspond to one or more of the terms that are shown in the graphic 1510 (see also, e.g., the holes 272, 274, 276 and 278 of FIG. 2).

As an example, a deviation from a digital well plan may be discerned by comparing a traveling plate view of the digital well plan to a traveling plate view of a well (e.g., borehole) as actually drilled. In such an example, the deviation may be input to a system that can output an outcome or outcomes. In such an example, an outcome may include information that can be represented in a traveling plate view, which may show a beneficial outcome (e.g., positive), a neutral outcome and/or a detrimental outcome (e.g., negative). For example, consider a beneficial outcome as wells being adequately spaced in a manner that may exceed spacing expected by a digital well plan; whereas, a detrimental outcome may be spacing less than expected by a digital well plan.

In the example of FIG. 15, the GUI 1500 can illustrate various wells such as a subject well and one or more offset wells. As shown, a traveling plate representation may be utilized for one or more of the wells. The traveling plate may be a planar representation with a boundary or circumference where a trajectory of a bore (e.g., a wellbore) may be within the boundary or circumference. As an example, a traveling plate may travel along a trajectory where the plate is a substantially planar representation that can maintain orthogonality to the trajectory, for example, a portion of the bore above and a portion of the bore below can be substantially normal to the plate (e.g., one an "upward" normal and the other a "downward" normal, which may be normal vectors).

As an example, at a particular length along a trajectory a view may be rendered such as one or more of the views to the left of the traveling plate view. In such an example, various types of information may be rendered in these views. As an example, a graphic can represent another well or graphics can represent other wells (e.g., bores or wellbores). As an example, as shown in FIG. 15, the graphics include no-go zones or no-go regions, which when circular may be referred to as no-go circles. These zones or regions can represent areas that are to be avoided by a selected subject well being planned, for example, to reduce risk of collision between trajectories.

Figure 16:
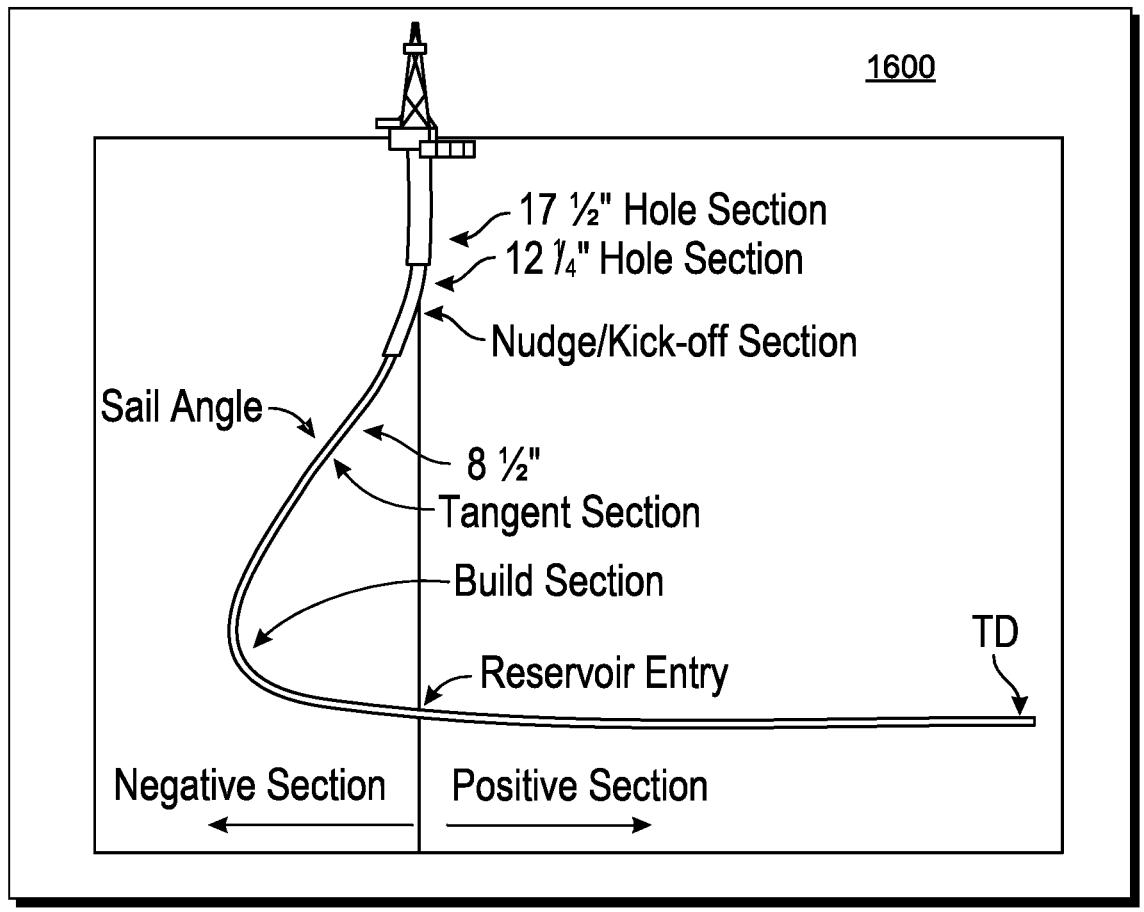
FIG. 16 illustrates an example of a GUI.

FIG. 16 shows an example of a graphical user interface (GUI) 1600 that includes a representation of a well that can be, for example, an actual well or a planned well. As shown, various factors exist that can describe a well. Such factors can include, for example, negative section, positive section, sail angle, hole section and associated size, nudge section, kick-off section, tangent section, build section, and reservoir entry. As an example, a digital well plan can include one or more of such factors where a delta may be determined based on actual data from drilling a well. For example, consider a sail angle being different between the digital well plan and the actual sail angle of a portion of a well being drilled.

FIG. 17 shows an example of a graphical user interface (GUI) 1700 that includes various subsystem tasks as may be part of a well plan. For example, a rig up subsystem, a casing subsystem, a cement subsystem, a drilling subsystem and a rig down subsystem are illustrated as some possible examples of subsystems that can include associated tasks. As shown in the example of FIG. 17, the GUI 1700 includes a timeline, which can be incremented by minute, hour, day, etc. In the example of FIG. 17, the GUI 1700 can be render information as to scheduled tasks that are organized by subsystem type where a scheduled task may aim to achieve a desired state of wellsite equipment. As an example, the GUI 1700 may optionally be operatively coupled to the output and/or input of one or more of the methods 1000, 1100, 1200, 1300 and 1400 of FIGS. 10, 11, 12, 13 and 14.

In the example of FIG. 17, the various tasks are shown as Sub-Activities and as other types of tasks (e.g., Idle, Bit Run, etc.), which may be considered to be Sub-Activities. As an example, graphical controls can allow for addition of one or more new activities (e.g., scheduling of new tasks). As an example, graphical controls can allow for rescheduling one or more tasks.

As an example, the GUI 1700 can include control graphics for options analyses as to implementation options as to one or more tasks. For example, a user may touch a touchscreen display as to the Sub-Activity 2 graphic under the Casing subsystem heading and call for selection of an implementation option.

In the example of FIG. 17, a dashed box represents a display device onto which the GUI 1700 can be rendered. For example, consider a flat panel display, which may be, for example, a touchscreen display.

As an example, one or more features illustrated in FIG. 17 may be linked to trajectory information and, for example, optionally update, revised, etc., in response to nudging of a portion of a trajectory, etc.

As shown in FIG. 17, a well plan can include information as to various activities, some of which may be classified as Sub-Activities as shown. Examples in FIG. 17 include activities such as rig up, casing, cement, drilling, and rig down. Such activities are shown with respect to a time line, which is indicated in month-date format (e.g., 12/11, 12/12, 12/13, 12/14, 12/15). As shown in FIG. 17, various activities may be performed sequentially and/or in parallel.

The GUI 1700 of FIG. 17 shows an example of a graphical notice rendered to a display as may be part of the GUI 1700. In the example, the graphical notice indicates that a deviation from a digital well plan has occurred. For example, where Bit Run 1 deviates from one or more aspects of the digital well plan, a computation framework can issue a signal to cause the graphical notice to be generated and rendered to a display, for example, in close proximity to a particular action. As an example, such a notice may cause or call for creation of one or more new activities. For example, where the Bit Run 1 deviated from the digital well plan, an existing Bit Run may be adjusted and/or a new Bit Run may be created. In such an example, the adjustment and/or creation may be based on output from a computational framework that operates at least in part on the deviation, which can be a delta. For example, the deviation may be input to a trained machine model to generate output that indicates whether the deviation (e.g., delta) is likely to cause a detrimental, beneficial or neutral outcome. The output may be rendered to a display, for example, as part of the GUI 1700 to provide information as to how or whether to adjust and/or create a Bit Run. As an example, a traffic light graphic may be rendered as a graphic or graphical control to a display where, upon occurrence of a deviation (e.g., a delta), the traffic light graphic renders a green light for a beneficial outcome, a yellow light for a neutral outcome and a red light for a detrimental outcome. In the example of FIG. 17, a traffic light graphic is shown within a window of the Bit Run 1, with a "red light" highlighted. As indicated, such a notification may lead to an adjustment and/or a creation of a task or tasks (see, e.g., adjust as to Bit Run 2 and/or create as to creation of a new Idle or Bit Run. As mentioned, a heat map approach may be implemented that color-codes various activities based at least in part on one or more deviations (e.g., deltas) and one or more associated outcomes from a system.

Figure 18:
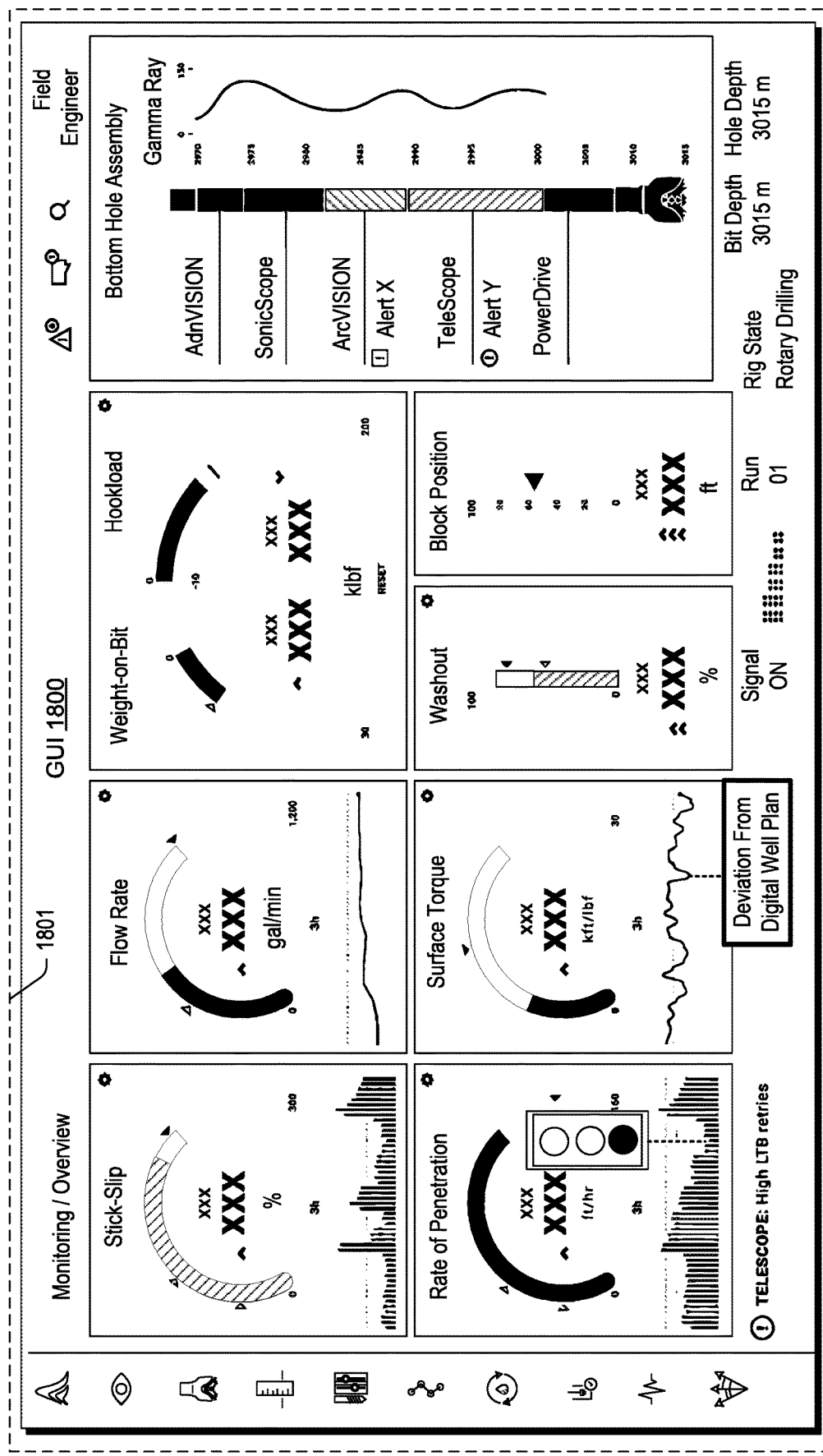
FIG. 18 illustrates an example of a GUI and examples of notification graphical controls.

FIG. 18 shows an example of a GUI 1800 that is rendered to a display device 1801, represented by a dashed box. For example, consider a flat panel display, which may be, for example, a touchscreen display.

In the example of FIG. 18, the GUI 1800 may be an operational dashboard where the state of one or more pieces of equipment, operations, etc. may be rendered visually, for example, via graphics and/or numbers. As an example, various colors may be utilized to convey state information. As an example, audio may be associated with the GUI 1800 and changes thereto, etc. For example, where a parameter reaches a limit, a color change may occur to a graphic of the display device 1801 and an audio alarm may be rendered via one or more speakers.

As an example, the GUI 1800 may optionally be operatively coupled to the output and/or input of one or more of the methods 1000, 1100, 1200, 1300 and 1400 of FIGS. 10, 11, 12, 13, and 14.

As shown in FIG. 18, the GUI 1800 can include one or more types of notification graphics or graphical controls such as, for example, a traffic light control as shown with respect to rate of penetration at a particular time and as to a notification as shown with respect to surface torque. In both instances, the notifications can be based on a deviation from a digital well plan (e.g., a delta). As shown, a notification can include information based on outcome for the deviation (e.g., an outcome for a delta). As mentioned, a delta can be detected during drilling where the delta is input to a trained machine model computational framework to determine a likely outcome where the likely outcome may be detrimental, beneficial or neutral. As mentioned, an outcome may be determined from a lookup (e.g., a search) of a database where such a search can be a query based on the deviation (e.g., delta) that looks for a matching deviation (e.g., delta) that has a corresponding outcome that can be returned as a search result. Conveyance of such information during drilling can improve drilling, for example, to achieve a desired rate of penetration, which may depend on, for example, an amount of surface torque (e.g., or weight on bit, RPM, flow rate, etc.).

FIG. 19 shows an example of a GUI 1910, which is shown as a table of data. As an example, the values (e.g., data) in the GUI 1910 may be selectable and editable and, for example, determined by a well planning system and/or revised by a well planning system. As an example, the GUI 1910 may optionally be operatively coupled to the output and/or input of one or more of the methods 1000, 1100, 1200, 1300 and 1400 of FIGS. 10, 11, 12, 13, and 14. As an example, the data in the table of the GUI 1910 of FIG. 19 may be data accessed from a digital well plan. For example, consider a digital well plan that is accessed by a computational framework that can be utilized during drilling or other rigsite activities. In such an example, the computational framework can access the digital well plan and render information from the digital well plan to a display, for example, via a GUI. As an example, such information can include data that can be utilized to determine whether a deviation has occurred with respect to the digital well plan. For example, consider the measured depth (MD) entry at 3284.31 feet does not have an inclination angle of 6.92 degrees. In such an example, the deviation can be in a number of degrees at a particular depth, which may be associated with other information as in the table. The number of degrees deviation and optionally other information can be input to a trained machine model to generate output such as a likely outcome of the deviation from the indicated inclination angle at the particular measured depth (MD). In the foregoing example, the deviation in inclination angle at the measured depth (MD) may give rise to a dogleg severity (DLS) issue, which is specified in degrees per 100 feet in the table of the GUI 1910, which itself may be determined and give rise to another deviation or delta that can be processed via a trained machine model and/or via a lookup in a database. As mentioned, detection of such a delta can cause a computational framework to issue a notification such as a graphic or graphics to a display (e.g., via a GUI or GUIs, etc.).

As an example, a wellbore trajectory can be a geometric trace that connects a well surface and one or more drilling targets. As an example, when a wellbore trajectory is designed by a drilling engineer, various rules (e.g., or Performance Indexes, abbreviated PIs) that a trajectory may expect to follow, for example, its kickoff point is to be below the mudline, it is not to have a collision issue with another existing well or wells, and its dogleg severity (DLS) is to be within the ability that drilling tools can turn, etc.

As an example, various constraints may be imposed on a method that can design one or more trajectories. For example, consider one or more of the following types of constraints: a landing direction constraint, a leadline constraint, a hardline constraint, a hole size constraint, a casing point constraint, a tool capability of a BHA constraint, a formation characteristic constraint, a bore type constraint, a number of targets constraint, a type of targets constraint, an anti-collision constraint, etc.

As to a bore constraint, consider one or more of a main bore constraint, a lateral bore constraint, and a re-planning bore constraint. As to multiple targets, one or more particular constrains may consider a relationship or relationships between the targets. As an example, a constraint may be imposed as to one or more local practices and/or client preferences.

As an example, a method can include receiving a digital well plan; issuing drilling instructions for drilling a well based at least in part on the digital well plan; comparing acquired information associated with drilling of the well with well plan information of the digital well plan; and outputting results based at least in part on the comparing of the acquired information with the well plan information. In such an example, the method can include determining a difference between the acquired information and the well plan information. Further, for example, consider identifying the difference as being associated with a positive outcome, identifying the difference as being associated with a negative outcome and/or analyzing the difference to determine at least one factor of the digital well plan as being at least in part an underlying cause of the difference. As an example, consider a difference in a rate of penetration of the drilling or another type of difference such as, for example, a difference in a dogleg of a wellbore of a well. As an example, a difference can be a deviation between a digital well plan operation and an actual operation, between a digital well plan piece of equipment and an actual piece of equipment, between a characteristic of a digital well plan bore and an actual bore, etc. As an example, a difference may be referred to as a delta. As an example, such a delta may be utilized for determining whether the delta is likely to give rise to an outcome or outcomes. As an example, a notification may be issued and rendered to a display of a graphical user interface (GUI) that pertains to an outcome or outcomes.

As an example, a method can include comparing that includes inputting a difference to a trained machine model that generates results, where the results include at least one outcome associated with the difference.

As an example, a method can include comparing that includes performing a search of a database utilizing the difference as a query wherein the search generates results, where the results include at least one outcome associated with the difference.

As an example, a method can include analyzing a difference to identify at least one factor specified in the digital well plan as being associated with the difference. For example, consider situations where the at least one factor includes an equipment factor, includes an operational factor and/or includes a formation factor.

As an example, a method can include storing results to a database, which may be utilized, for example, to generate and/or revise a well plan.

As an example, a method can include generating a digital well plan for a well. For example, consider receiving information for the well, selecting one or more offset wells, accessing comparison results for the one or more offset wells, and generating the digital well plan based at least in part on at least a portion of the comparison results for the one or more offset wells.

As an example, a method can include revising a digital well plan for a well. For example, consider revising the digital well plan based at least in part on at least a portion of comparison results for the well. As an example, revising a digital well plan can be based at least in part on comparison results for one or more offset wells. In such an example, at least one of the one or more offset wells may be being drilled simultaneous to the well for which the well plan is being revised.

As an example, a digital well plan can include one or more of a trajectory factor, a bottom hole assembly factor, and an operational factor.

As an example, a system can include one or more processors; memory operatively coupled to the one or more processors; and processor-executable instructions stored in the memory and executable by at least one of the one or more processors to instruct the system to: receive a digital well plan; issue drilling instructions for drilling a well based at least in part on the digital well plan; compare acquired information associated with drilling of the well with well plan information of the digital well plan; and output results based at least in part on the comparing of the acquired information with the well plan information.

As an example, one or more computer-readable storage media can include computer-executable instructions executable to instruct a computing system to: receive a digital well plan; issue drilling instructions for drilling a well based at least in part on the digital well plan; compare acquired information associated with drilling of the well with well plan information of the digital well plan; and output results based at least in part on the comparing of the acquired information with the well plan information.

Figure 20:
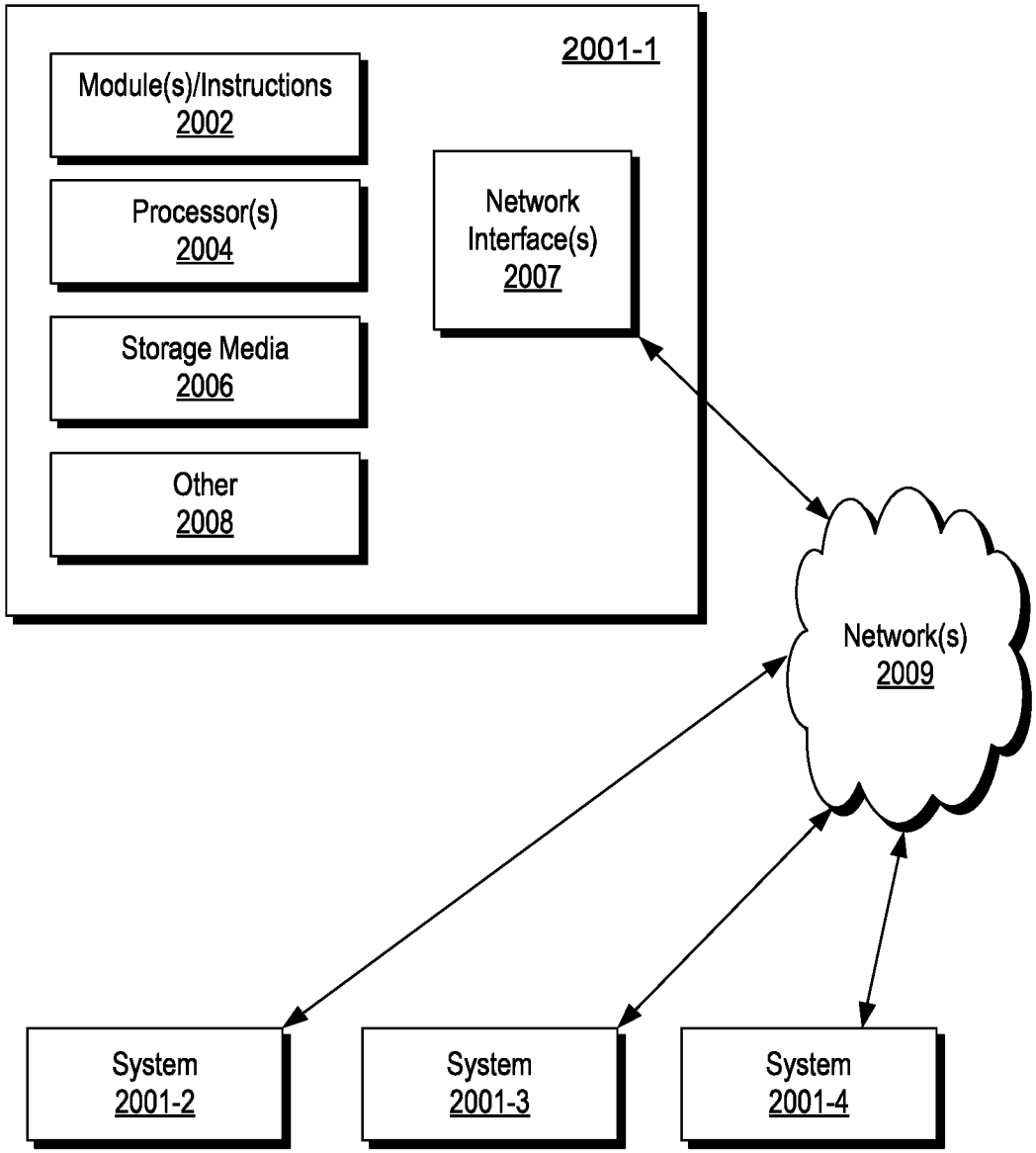
FIG. 20 illustrates examples of computing and networking equipment.

In some embodiments, a method or methods may be executed by a computing system. FIG. 20 shows an example of a system 2000 that can include one or more computing systems 2001-1, 2001-2, 2001-3 and 2001-4, which may be operatively coupled via one or more networks 2009, which may include wired and/or wireless networks.

As an example, a system can include an individual computer system or an arrangement of distributed computer systems. In the example of FIG. 20, the computer system 2001-1 can include one or more modules 2002, which may be or include processor-executable instructions, for example, executable to perform various tasks (e.g., receiving information, requesting information, processing information, simulation, outputting information, etc.).

As an example, a module may be executed independently, or in coordination with, one or more processors 2004, which is (or are) operatively coupled to one or more storage media 2006 (e.g., via wire, wirelessly, etc.). As an example, one or more of the one or more processors 2004 can be operatively coupled to at least one of one or more network interface 2007. In such an example, the computer system 2001-1 can transmit and/or receive information, for example, via the one or more networks 2009 (e.g., consider one or more of the Internet, a private network, a cellular network, a satellite network, etc.).

As an example, the computer system 2001-1 may receive from and/or transmit information to one or more other devices, which may be or include, for example, one or more of the computer systems 2001-2, etc. A device may be located in a physical location that differs from that of the computer system 2001-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2006 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 21:
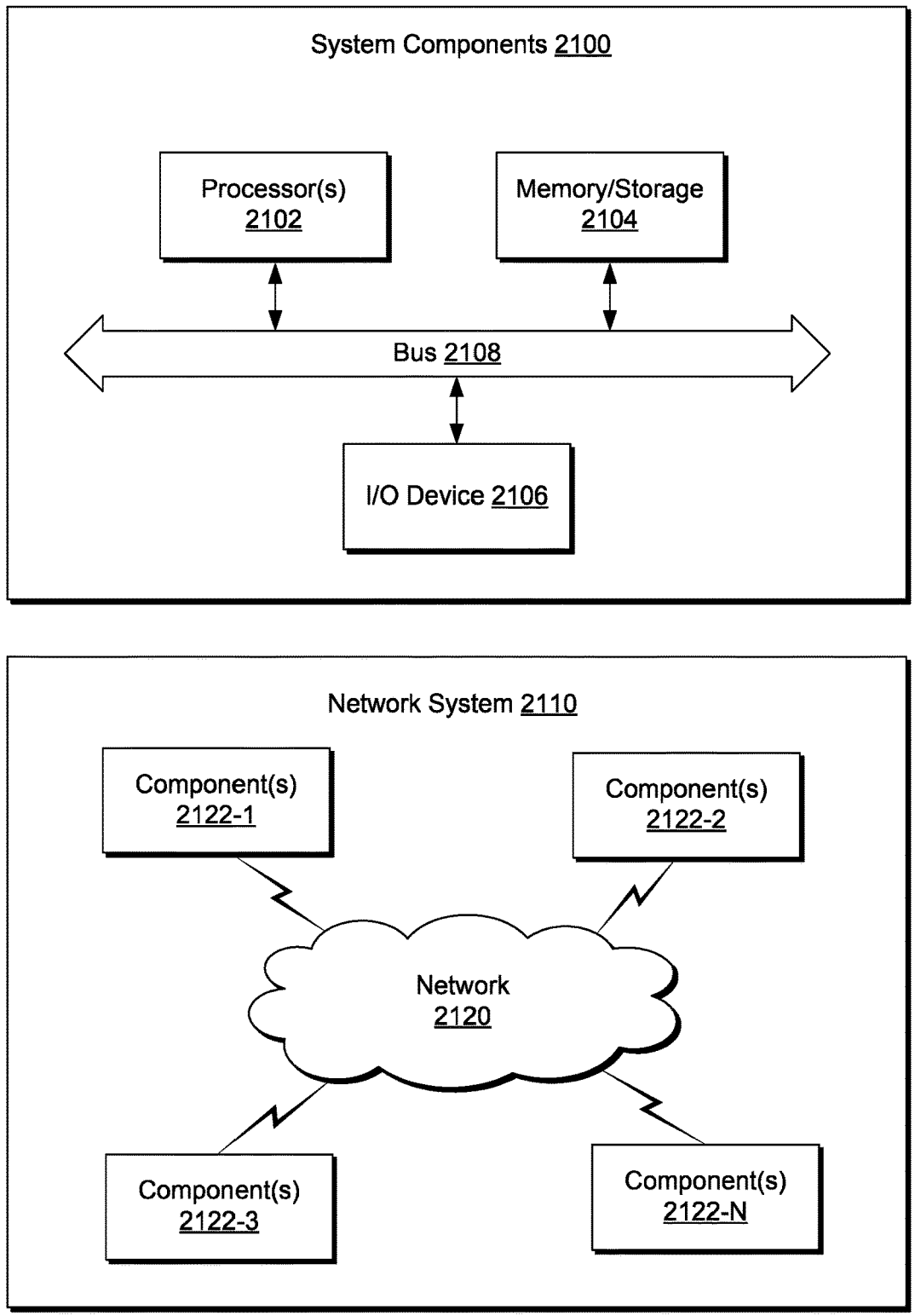
FIG. 21 illustrates example components of a system and a networked system.

FIG. 21 shows components of a computing system 2100 and a networked system 2110. The system 2100 includes one or more processors 2102, memory and/or storage components 2104, one or more input and/or output devices 2106 and a bus 2108. According to an embodiment, instructions may be stored in one or more computer-readable media (e.g., memory/storage components 2104). Such instructions may be read by one or more processors (e.g., the processor(s) 2102) via a communication bus (e.g., the bus 2108), which may be wired or wireless. The one or more processors may execute such instructions to implement (wholly or in part) one or more attributes (e.g., as part of a method). A user may view output from and interact with a process via an I/O device (e.g., the device 2106). According to an embodiment, a computer-readable medium may be a storage component such as a physical memory storage device, for example, a chip, a chip on a package, a memory card, etc.

According to an embodiment, components may be distributed, such as in the network system 2110. The network system 2110 includes components 2122-1, 2122-2, 2122-3, . . . 2122-N. For example, the components 2122-1 may include the processor(s) 2102 while the component(s) 2122-3 may include memory accessible by the processor(s) 2102. Further, the component(s) 2122-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
generating a digital well plan, wherein generating the digital well plan comprises receiving information for a well, selecting one or more offset wells, accessing comparison results for the one or more offset wells, and generating the digital well plan based at least in part on at least a portion of the comparison results for the one or more offset wells;
receiving the digital well plan;
issuing drilling instructions for drilling the well based at least in part on the digital well plan;
comparing acquired information associated with drilling of the well with well plan information of the digital well plan; and
outputting results based at least in part on the comparing of the acquired information with the well plan information.

2. The method of claim 1 wherein the comparing comprises determining a difference between the acquired information and the well plan information.

3. The method of claim 2 wherein the comparing comprises inputting the difference to a trained machine model that generates results, wherein the results comprise at least one outcome associated with the difference.

4. The method of claim 2 wherein the comparing comprises performing a search of a database utilizing the difference as a query wherein the search generates results, wherein the results comprise at least one outcome associated with the difference.

5. The method of claim 2 comprising identifying the difference as being associated with a positive outcome and/or a negative outcome.

6. The method of claim 2 comprising analyzing the difference to determine at least one factor of the digital well plan as being at least in part an underlying cause of the difference.

7. The method of claim 2 wherein the difference comprises a difference in a rate of penetration of the drilling or a difference in a dogleg of a wellbore of the well.

8. The method of claim 2 comprising analyzing the difference to identify at least one factor specified in the digital well plan as being associated with the difference, optionally wherein the at least one factor comprises at least one of an equipment factor, an operational factor and a formation factor.

9. The method of claim 1 wherein the outputting comprises storing the results to a database.

10. The method of claim 1 comprising revising the digital well plan, wherein the revising comprises revising the digital well plan based at least in part on at least a portion of the results.

11. The method of claim 1 wherein the digital well plan comprises at least one member selected from a group consisting of a trajectory factor, a bottom hole assembly factor, and an operational factor.

12. A system comprising:
one or more processors;
memory operatively coupled to the one or more processors; and
processor-executable instructions stored in the memory and executable by at least one of the one or more processors to instruct the system to:
generating a digital well plan, wherein generating the digital well plan comprises receiving information for a well, selecting one or more offset wells, accessing comparison results for the one or more offset wells, and generating the digital well plan based at least in part on at least a portion of the comparison results for the one or more offset wells;
receive the digital well plan;
issue drilling instructions for drilling the well based at least in part on the digital well plan;
compare acquired information associated with drilling of the well with well plan information of the digital well plan; and
output results based at least in part on the comparing of the acquired information with the well plan information.

13. The system of claim 12, wherein the comparing comprises determining a difference between the acquired information and the well plan information.

14. The system of claim 13 wherein the comparing comprises inputting the difference to a trained machine model that generates results, wherein the results comprise at least one outcome associated with the difference.

15. The system of claim 13 wherein the comparing comprises performing a search of a database utilizing the difference as a query wherein the search generates results, wherein the results comprise at least one outcome associated with the difference.

* * * * *